(12) United States Patent
Belski et al.

(10) Patent No.: US 6,657,552 B2
(45) Date of Patent: Dec. 2, 2003

(54) SYSTEM AND METHOD FOR COMMUNICATING AND CONTROL OF AUTOMATED METER READING

(75) Inventors: Timothy J. Belski, Washington, PA (US); Rex A. Johnson, Uniontown, PA (US); Bruce E. Gray, Murrysville, PA (US)

(73) Assignee: Invensys Metering Systems-North America Inc., Uniontown, PA (US)

( * ) Notice: Subject to any disclaimer, the term of this patent is extended or adjusted under 35 U.S.C. 154(b) by 0 days.

(21) Appl. No.: 10/138,332

(22) Filed: May 6, 2002

(65) Prior Publication Data
US 2002/0193144 A1 Dec. 19, 2002

Related U.S. Application Data
(60) Provisional application No. 60/288,427, filed on May 4, 2001.

(51) Int. Cl.[7] .............................................. G08B 23/00
(52) U.S. Cl. .......................... 340/870.02; 340/870.03; 455/67.1
(58) Field of Search ................... 340/870.02, 870.03, 340/870.18; 343/713, 718; 307/106; 455/67.1

(56) References Cited

U.S. PATENT DOCUMENTS

| 5,438,329 | A | | 8/1995 | Gastouniotis et al. .. 340/870.02 |
| 5,530,298 | A | * | 6/1996 | Gerhold ...................... 307/106 |
| 5,600,333 | A | * | 2/1997 | Justice et al. ................ 343/713 |
| 5,673,252 | A | | 9/1997 | Johnson et al. .............. 370/449 |
| 5,874,903 | A | | 2/1999 | Shuey et al. ........... 340/870.02 |
| 5,892,758 | A | | 4/1999 | Argyroudis .................. 370/335 |

FOREIGN PATENT DOCUMENTS

| WO | WO 98/10394 | 3/1998 |
| WO | WO 01/48490 | 7/2001 |

* cited by examiner

Primary Examiner—Michael Horabik
Assistant Examiner—Albert K. Wong
(74) Attorney, Agent, or Firm—Andrus, Sceales, Starke & Sawall, LLP

(57) ABSTRACT

A meter for collecting and communicating flow data for a commodity including a liquid, a gas, or electricity transported via a metered system, using wireless data transfer, the meter including a housing, a sensor for sensing a resource flow rate, and a register for registering data input thereto, the register including a processor for processing data input thereto. A wireless transmitter is also provided for outputting the sensed data from the meter or receiving instruction information through an antenna. A TouchRead interface may also be provided for outputting the sensed data from the meter or receiving instruction information from a device external to the meter, which receives data output from the meter and/or outputs instruction information to the meter. The sensor, the processor, and the wireless transmitter are disposed within the housing.

19 Claims, 25 Drawing Sheets

RFR/RFI functional Block Diagram

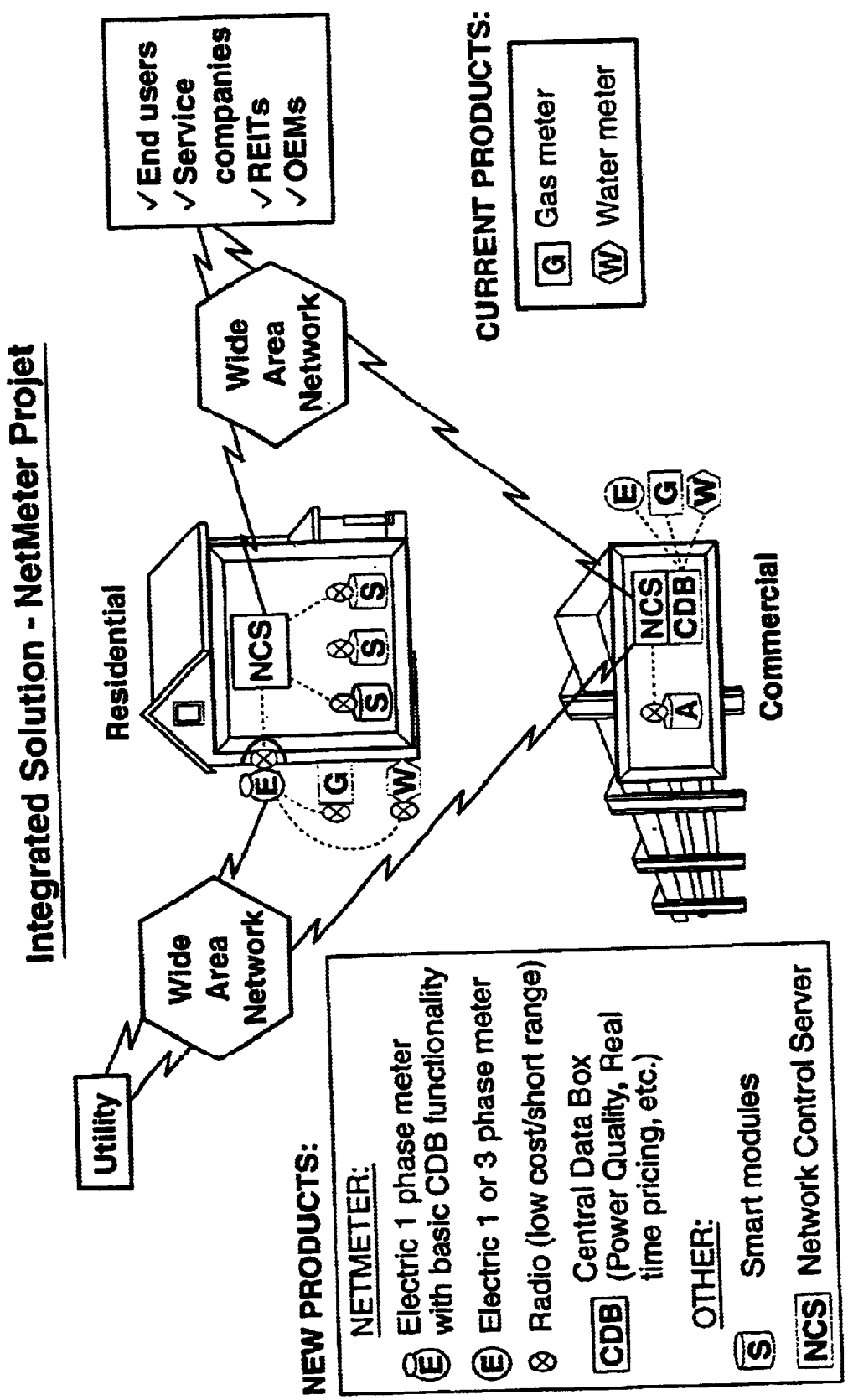
FIG. 3 – RFR/RFI functional Block Diagram

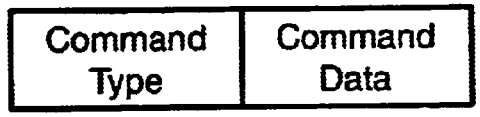
FIG. 4 - Information Format (Command Data Unit)
FIG. 5 - Non Network Mode Frame Format
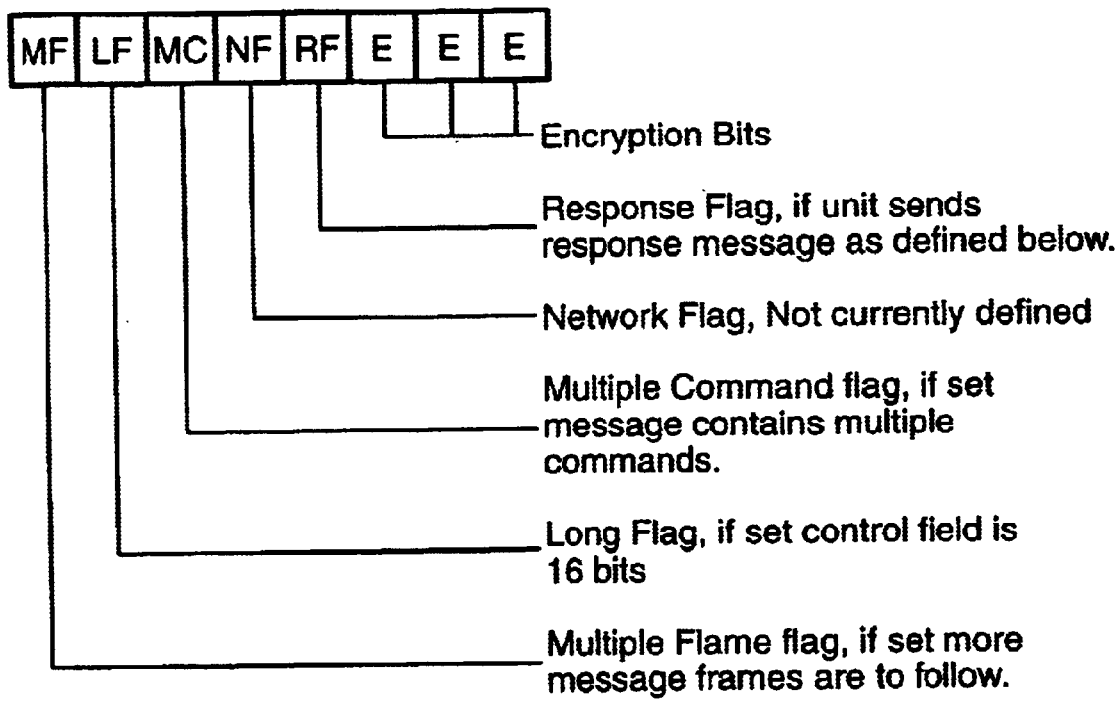
FIG. 6 - Control Field Format

FIG. 7 - Sixteen Bit Control Field Format
FIG. 8 – Response Format
| Status Field | Definition |
|---|---|
| 0x01 | Command complete, no errors |
| 0x02 | Error, unable to execute command |
| 0x03 | Error, unknown command |
| 0x04 | Error, unsupported control bit pattern |
| 0xFC | Frame received, no error |
| 0xFD | Message corrupt |
| 0xFE | Wait status |
FIG. 9 - Status Field

| Command Name | Cmd Byte | Description |
|---|---|---|
| View Factory ID | 0x01 | Slave will send response message containing the factory programmed ID. |
| Set Factory ID | 0x02 | Slave will program factory ID contained in message. |
| View Programmable ID | 0x03 | Slave will send response containing customer ID. |
| Set Programmable ID | 0x04 | Slave will program ID contained in message. |
| #View Version and Type (Required command) | 0x05 | Slave will send response message containing the protocol version, device type and software version. |
| No Command | 0x06 | There is no command number six. |
| View Programmable Text | 0x07 | Slave will send response message containing the programmable text. |
| Set Programmable Text | 0x08 | Slave will program text contained in message. |
| View Number of Reading Digits | 0x09 | Slave will send response message containing the current number of reading digits. |
| Set Number of Reading Digits | 0x0A | Slave will program the number of reading digits sent in the message. |
| View Reading Units | 0x0B | Slave will send a response message containing the number representing the current registration units. |
| Set Reading Units | 0x0C | Slave will program the registration units to the value contained in the message. |
| View Rate Units | 0x0D | Slave will sent a responce message containing a number representing the current rate units. |
| Set Rate Units | 0x0E | Slave will program the rate units to the value contained in the message. |
| View Reading Resolution (multiplier) | 0x0F | Slave will send a response message containing a number representing the current reading resolution. |
| Set Reading Resolution (multiplier) | 0x10 | Slave will program the reading resolution to the value contained in the message. |
| View Rate Resolution (multiplier) | 0x11 | Slave will send response message containing a number representing the current rate resolution. |
| Set Rate Resolution (multiplier) | 0x12 | Slave will program the rate resolution to the value contained in the message. |
| View Total Reset | 0x13 | Slave will sent message containing the total preset value. |
| Set Total Reset | 0x14 | Slave will program the preset total to the value contained in the message. |
| View Reading Mode | 0x15 | Slave will send a message containing an one byte binary number that represents the setting of the unidirectional reading mode. |
| Set Reading Mode | 0x16 | Slave will set the reading mode to the value contained in the message. |
| Device Specific Command | 0xFD | Command byte is followed by one or more bytes. The command is specific to the slave device. |
| Frame Acknowledge | 0xFE | This command is sent by the master to acknowledge a frame in a multi-frame response message. |
| Extended Command | 0xFF | Extended commands, TBD. |

FIG. 10 - Command Type Definitions

| Command (hexadecimal) | Description |
|---|---|
| 0x01 | View Factory ID |
| 0x02 | Set Factory ID - (Factory programmable only) |
| 0x03 | View Programmable ID |
| 0x04 | Set Programmable ID |
| 0x05 | View Version and Type |
| 0x07 | View programmable Text |
| 0x08 | Set Programmable Text |
| 0x09 | View Number of Reading Digits |
| 0x0A | Set Number of Reading Digits |
| 0x0B | View Reading Units |
| 0x0C | Set Reading Units |
| 0x0F | View Reading Resolution (multiplier) |
| 0x10 | Set Reading Resolution (multiplier) |
| 0x15 | View Reading Mode |
| 0x16 | Set Reading Mode |
| 0xFD 0x01 | View Chamber Constant |
| 0xFD 0x02 | Set Chamber Constant |
| 0xFD 0x03 | View Status Byte |
| 0xFD 0x04 | Set Status Byte |
| 0xFD 0x05 | View Hop Sequence |
| 0xFD 0x06 | Set Hop Sequence |
| 0xFD 0x07 | View Next Frequency |
| 0xFD 0x08 | Set Next Frequency |
| 0xFD 0x09 | View Transmit Interval |
| 0xFD 0x0A | Set Transmit Interval |
| 0xFD 0X0B | View Transmit Variation |
| 0xFD 0x0C | Set Transmit Variation |
| 0xFD 0x0D | View Battery Test Enable |
| 0xFD 0x0E | Set Battery Test Enable |
| 0xFD 0x0F | View RF Protocol Type |
| 0xFd 0x10 | Set RF Protocol Type |
| 0xFD 0x11 | View RF Power Level |
| 0xFD 0x12 | Set RF Power Level |
| 0xFD 0x13 | View Rf Frequency Value |
| 0xFD 0x14 | Set RF frequency Value |

FIG. 11 - RFR Common and Device Specific Commands

| Symbol | Description | Min | Max | Units |
|---|---|---|---|---|
| $T_{SO}$ | Power Clock Low Time, Data 0 | 200 | 300 | μsec |
|  |  |  | 50 | %$T_{REF}$ |
| $T_{SI}$ | Power Clock Low Time, Data 1 | 500 | 600 | μsec |
| $T_{DLY}$ | Inter Character Delay | 0 | 100 | msec |
| $T_{ICD}$ | Intra Character Delay | 0 | 100 | msec |

FIG. 12

| Symbol | Description | Min | Max | Units |
|---|---|---|---|---|
| $T_{SO}$ | Power Clock Low Time, Data 0 | 200 | 300 | Msec |
|  |  |  | 50 | %$T_{REF}$ |
| $T_{SI}$ | Power Clock Low Time, Data 1 | 500 | 600 | μsec |
| $T_{SO}$ | Power Clock Low Time, Data 0 | 200 | 300 | μsec |
| $T_{SI}$ | Power Clock Low Time, Data 1 | 500 | 600 | μsec |

FIG. 13

| Unit | Gallons Per | Resolution LS Digit = | -4 0.0001 | -3 0.001 | -2 0.01 | -1 0.1 | 0 1 | 1 10 | 2 100 | 3 1000 |
|---|---|---|---|---|---|---|---|---|---|---|

5/8" SR II Rev/Gal: 57.778

| Gallons | | | | | | | | | | |
|---|---|---|---|---|---|---|---|---|---|---|
| IGAL | 1.20095 | | n/a | n/a | 464,598,040 | 46,459,804 | 4,645,980 | 464,598 | 46,459 | 4,645 |
| CuFt | 7.480519 | | n/a | 3,868,587,707 | 386,858,770 | 38,685,877 | 3,868,587 | 386,858 | 38,685 | 3,868 |
| | | | n/a | 621,077,281 | 62,107,728 | 6,210,772 | 621,077 | 62,107 | 6,210 | 621 |
| m3 | 264.1721 | | 175,869,458 | 17,586,945 | 1,758,694 | 175,869 | 17,586 | 1,758 | 175 | 17 |

3/4" SR II Rev/Gal: 32.4593

| Gallons | | | | | | | | | | |
|---|---|---|---|---|---|---|---|---|---|---|
| IGAL | 1.20095 | | n/a | n/a | 826,990,896 | 82,699,089 | 8,269,908 | 826,990 | 82,699 | 8,264 |
| CuFt | 7.480519 | | n/a | n/a | 688,613,927 | 68,861,392 | 6,886,139 | 688,613 | 68,861 | 6,886 |
| | | | n/a | 1,105,526,095 | 110,552,609 | 11,055,260 | 1,105,526 | 110,552 | 11,055 | 1,105 |
| m3 | 264.1721 | | 313,050,051 | 31,305,005 | 3,130,500 | 313,050 | 31,305 | 3,130 | 313 | 31 |

1" SR II Rev/Gal: 15.2972

| Gallons | | | | | | | | | | |
|---|---|---|---|---|---|---|---|---|---|---|
| IGAL | 1.20095 | | n/a | n/a | 1,754,801,244 | 175,480,124 | 17,548,012 | 1,754,801 | 175,480 | 17,548 |
| CuFt | 7.480519 | | n/a | n/a | 1,461,177,604 | 146,117,760 | 14,611,776 | 1,461,177 | 146,117 | 14,611 |
| | | | n/a | 2,345,828,203 | 234,582,820 | 23,458,282 | 2,345,828 | 234,582 | 23,458 | 2,345 |
| m3 | 264.1721 | | 664,264,411 | 66,426,441 | 6,642,644 | 664,264 | 66,426 | 6,642 | 664 | 66 |

FIG. 16

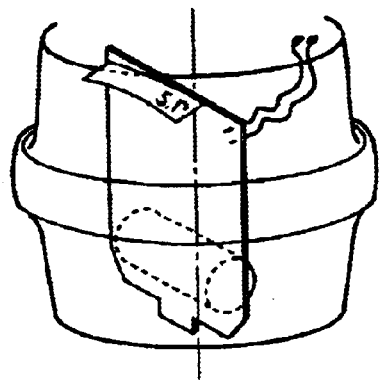
FIG. 17a
Vertical PCB
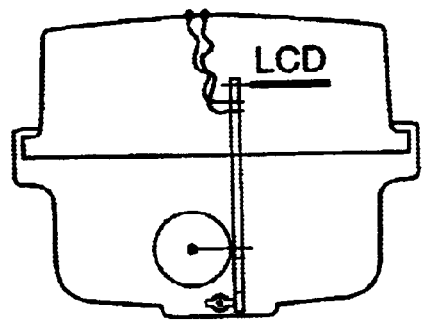
FIG. 17b
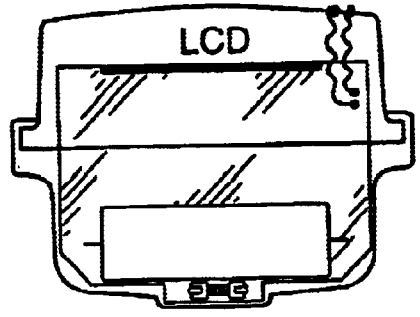
FIG. 17d
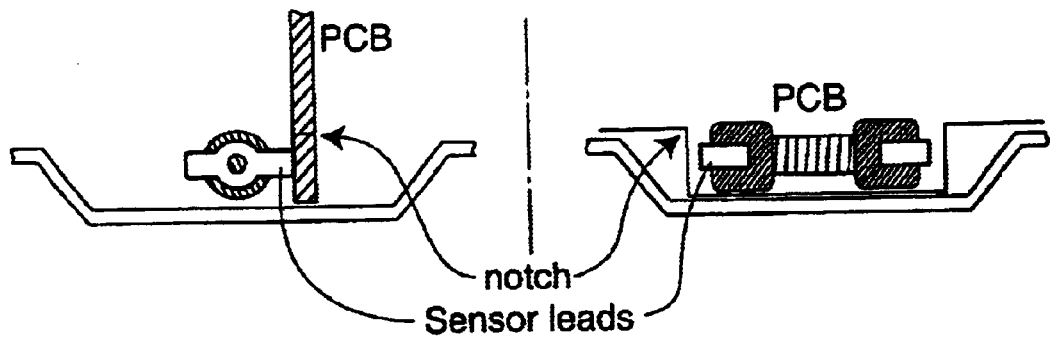
FIG. 17c          FIG. 17e

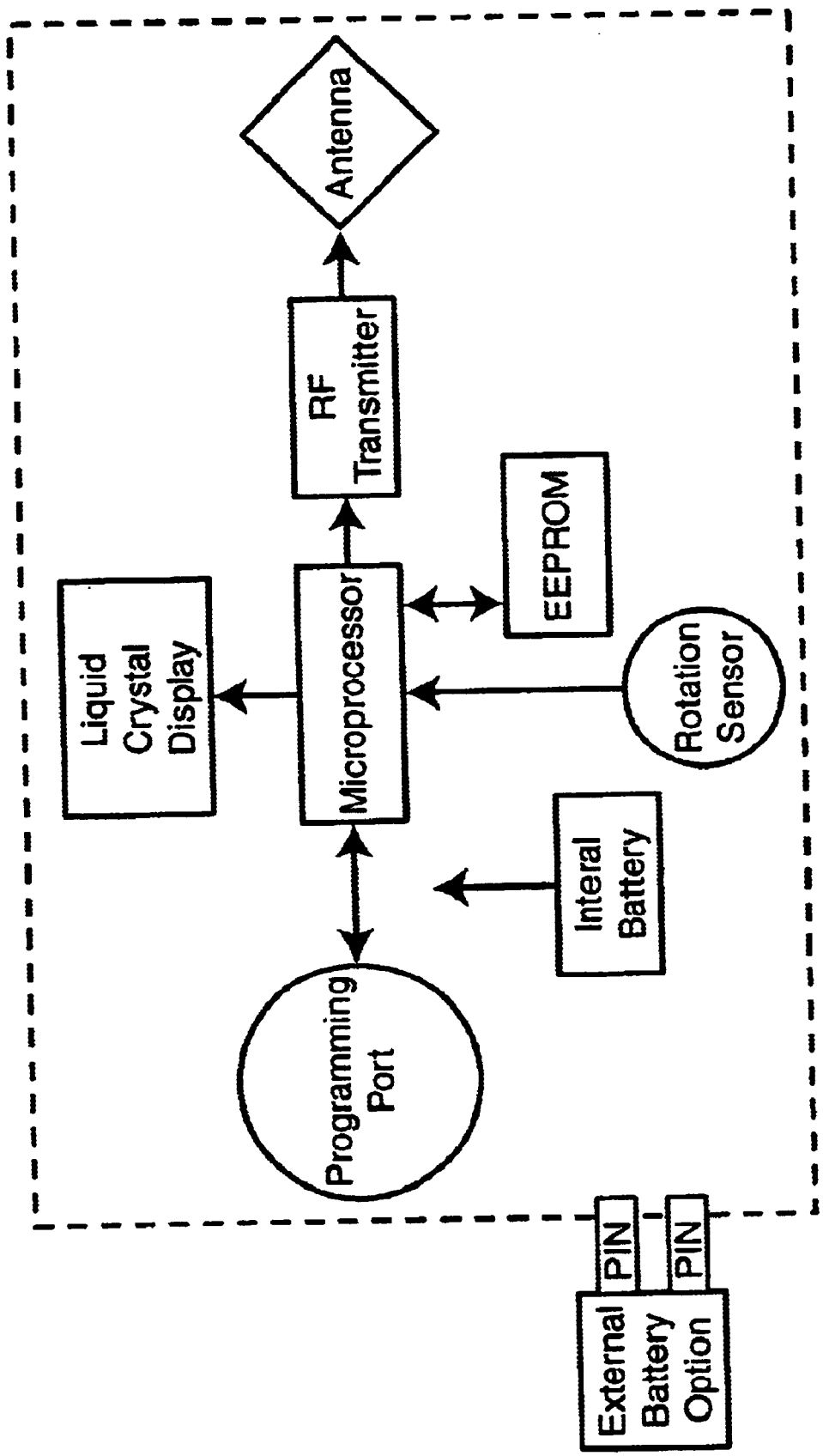
FIG. 18 - RFR/RFI Functional Block Diagram

| Sym | Description | Min. | Max. | Units |
|---|---|---|---|---|
| | Power/Clock Voltage High | 4.5 | 15 | Volts |
| | Power/Clock Voltage Low | 0 | 0.5 | Volts |
| | Power/Clock current 5 volts | | 5 | mA |
| | 15 volts | | 15 | |
| | 0 volts | | -0.2 | |
| | Data Out Voltage High (note 3) | | 5.5 | Volts |
| | Data Out Voltage Low (1=3.2mA) | | 0.4 | Volts |
| | Data Out Current | | 5 | mA |
| TPOR | Power On to Register Ready (note 3) | | 500 | msec |
| TCL | Power/Clock low time | | | |
| | Power/Clock voltage = 10 V | 250 | 2000 | μsec |
| | Power/Clock voltage = 4.5 V | 250 | 1000 | μsec |
| | Power/Clock low time jitter (note 4) | | 25 | % |
| TCH | Power/Clock high time (note 5) | | | |
| | Power/Clock voltage = 10 V | 250 | Note 6 | μsec |
| | Power/Clock voltage = 4.5 V | 500 | | μsec |
| | Power/Clock Duty Cycle = $\frac{TCH}{TCH+TCL}$ | 50 | | % |
| TDC | Delay, Clock to Data Out | | 250 | μsec |
| TRR | Register Re-Read Time (note 3) | | 500 | msec |
| TRC | Reset Command. Time for Power/Clock low to force register reset | | 200 | msec |

FIG. 20

| Main Field Character | Sub-Field Character | Description |
|---|---|---|
| R | B | Reading field. Format for use is: ;Rtn[,m[,u:s]] where "t" is a type code subfield defined below. The "n" is the actual meter reading and consists of a string of 0 to 8 character mantissa and a zero to four character fraction Valid characters are: "0-9", "c", "?", "-" and "." On decimal power with the range -99 to +99. The "u" is the unit field and "s" is the time field as defined in Section 5.1 and Table 3 and 4 below. |
| | A | Currrent Reading. |
| | B | Time Dated Reading. |
| | A,M,N,P,Q | Reserved. |
| I | | Identification field. Format for use is: ;Itn where "t" is a type code subfield defined in UI-1223. The "n" is an identification code represented as a string of up to 12 characters. Valid charaters are: "0-9", "A-Z", "a-z". "?" is valid as an error indicator. The identification field is programmable on some Sensus products. Consult the individual product specification to determine if field is programmable. |
| A | | Alarm Field. Format for use is: ;An,n,n where "n" is a numeric code representing an alarm condition. Up to 8 alarm code subfields are permitted. The definition of alarm code is determined by the meter vendor, and is referenced to the type code of the ID field. The format is specified in an accompanying specification from the manufacturer. It is not intended that the presence of the Alarm field indicates an error condition, Instead interpretation of the codes must be done to determine if any error exist. |

FIG. 22a

| Main Field Character | Sub-Field Character | Description |
|---|---|---|
| G | | Flowrate. Format for use is: ;Gtn[,m[,u,s]] where "t" is a type code subfield defined below. The "n" is the actual meter reading and consists of a string of 0 to 8 characters Valid characters are: "0-9","e","?","-" and "." One decimal is allowed. The "m" is the multiplier/divisor an is specified as a decimal power with the range -99 to +99. The "u" is the units field and "s" is the time field as defined in Section 5.1 and Table 3 and 4 below. |
| | C | Current flowrare |
| | X | Maximum flowrate |
| | N | Minimum flowrate |
| X | | Transducer measurement field. Format for use is ;Xtvalue[.m[u]] where "t" indicates measurement type and is defined below. Values are measurement type dependent. The "m" is the multiplier/divisor and is decimal power. The "u" is the units field as defined in Section 5.1 and Table 3 and 4 below. |
| | P | Pressure |
| | T | Temperature |
| | V | Voltage |
| | R | Reactive |
| Z | | Date and Time field. Format for use is: ";Zddmm[yy],hhmm[ss]" where:<br>    dd - Day of month (01-31)<br>    mm - Month of year (01-12)<br>    yy - Year (00-99), optional<br>    hh - hour (00-23)<br>    mm - minute (00-59)<br>    ss - second (00-59), optional |
| J | | Programmable Text Field. Contains zero twenty ASCII characters. |

FIG. 22b

| Main Field Character | Sub-Field Character | Description |
|---|---|---|
| M | | Manufacturer Field. Data specific to an individual manufacturer's products. The first subfield should refer to the meter type. The format of the remainder of the field is specified in an accompanying specification from the manufacturer. Format for use is: ;Mt,r,r,..r. Multiple manufacturers fields are allowable in a single message. |
| K | | Factory ID Field. Format for use is: ;Kn where n is a string of one to twelve ASSII alphanumeric characters. Valid characters are: "0-9", "A-Z", "a-z". "?" is valid as an error indicator. The field is not present in all Sensus products. The individual product specification should be consulted to determine if this field is supported. |

FIG. 22b (con't)

| Measurement Units | |
|---|---|
| Character | Units |
| 0 | Cubic Meters |
| 1 | Cubic Feet |
| 2 | Cubic Inches |
| 3 | Cubic Yards |
| 4 | US Gallons |
| 5 | Imperial Gallons |
| 6 | Acre Feet |
| 7 | Kiloliters |
| 8 | Liters |
| 9 | Watt Hours |
| 10 | Kilowatt Hours |

FIG. 23

| Time Units | |
|---|---|
| Character | Units |
| 0 | Milliseconds |
| 1 | Seconds |
| 2 | Minutes |
| 3 | Hours |
| 4 | Days |
| 5 | Years |

FIG. 24

SYSTEM AND METHOD FOR COMMUNICATING AND CONTROL OF AUTOMATED METER READING

CROSS-REFERENCE TO RELATED APPLICATION

This invention claims priority to Provisional U.S. Patent Application Ser. No. 60/288,427, filed on May 4, 2001.

FIELD OF THE INVENTION

The present invention relates to automated meter reading and control, and more particularly to systems and methods for automated utility resource measurements, data collection and exercise of control and notification.

BACKGROUND ART

Automated meter reading for consumption rate of different utility resources such as water, gas or electricity has become more desirable compared to the methods using meters that require manual reading and recording of the consumption levels. One type of automated "local" means of collecting meter reading requires an operator to be in close physical proximity of the meter to obtain the meter reading (touch read) and transporting the data to a central computer.

Another type of automated meter reading is based on collection of data by telephone lines or radio transmission. The meter reading, in both cases, may be collected through the phone lines connected to the meter (phone read) or communicated to a portable hand-held computer. The radio based meters, such as those provided in U.S. Pat. Nos. 4,652,877 and 4,782,341 issued to Gray and currently assigned to the present assignee, incorporated herein by reference, were more widely used since the reading could be collected as an operator drove by the meter (drive-by system), or in combination with the touch read system, be read manually. The radio read is particularly desirable in areas where the meter, specifically the water meter, is inside a pit at a distance from the building and away from a power source. However, in such systems, the antenna was disposed outside of the meter and was hardwired to the mechanical register through the meter housing so the signals passing from the register to the RF transmitter were not wireless.

However, the collected data from each utility meter must be transported to a central computer and compiled for billing, statistical or any other services that the utility companies may provide to their customers. Each of the aforementioned automated meter reading techniques still requires a large amount of manpower and is susceptible to errors in entry and transportation of data. Moreover, the utility companies cannot exercise any control or provide notifications to their customers without using additional manpower, cost and potentially less reliable means of communication.

To date, water meters have operated on the basis of a mechanical odometer, with electronic reading of the odometer wheels. The mechanical encoder concept has been thought to offer improved performance over pulse counting systems, particularly where the meter is physically separate from the counting device.

Consequently, a need exists for an improved data collection system for remote meter devices, such as gas, water, and electric meters.

SUMMARY OF THE INVENTION

The present invention addresses the need for an improved data collection system for remote meter devices, such as gas, water, and electric meters. The present invention accomplishes this, in part, by enabling RF communication, preferably bi-directional communication, between a meter and an interface device, as described herein.

Applicants recognized that the mechanical encoder having limited functionality in water and gas meters has a limited future. Applicant also recognized that improved functionality may be provided at lower cost by manufacturing an integrated register and RF transmitter, as opposed to manufacture them as separate products. Further, combination of the encoding register and RF transmitter permit sharing of hardware, which reduces hardware and manufacturing cost.

The invention includes a meter for collecting and communicating flow data for a commodity including a liquid, a gas, or electricity transported via a metered system, using wireless data transfer, the meter including a housing, a sensor for sensing a resource flow rate, and a register for registering data input thereto, the register including a processor for processing data input thereto. A wireless transmitter is also provided for outputting the sensed data from the meter or receiving instruction information from an interface external to the meter, which receives data output from the meter and/or outputs instruction information to the meter. The sensor, the processor, and the wireless transmitter are disposed within the housing.

The invention may be embodied within a networked, web enabled, electronic measurement and control system that will link users and utility service providers to residential and commercial/industrial energy meters. Through wireless communication and low power communications modules, electronic solid state utility meters transmit meter reading data to an interface device, which in turn communicates bi-directionally with a master station. The interface device transmits information and control signals received from the master station through a network server to other electronic modules in the building for additional user interface.

One aspect of the present invention relates to electronic water and/or gas meters with integrated wireless communication modules, preferably powered by an internal battery. The meters obtain data related to consumption rate of the utility resource and transmit RF data periodically to receiving devices. The periodical transmission of data reduces power consumption of internal circuits.

Another aspect of the present invention, as may be applied to water and gas meters, includes a processor which receives data in the form of a pulse count from the sensed forward rotations of the magnetic sensor, prepares the data for transmission, enables the transmitter circuitry to transmit the data at specified intervals, and supports a programming interface without missing pulses.

Another aspect of the present invention relates to a method of collecting and transmitting utility resource consumption data from multiple meters to an interface device. The method further comprises transmission of the collected data to a master station. The master station further processes the collected data and transmits informational and control data back to the interface device.

A further aspect of the present invention relates to a method and software for receiving consumption data from a plurality of meters in an interface device, reading the received data and performing programming and diagnostic functions. The interface device communicates with a master station as well as with various electronic modules inside the building through wireless transmission. A clock controls the intervals for performing different functions as determined by the program code and time stamps the received data that is then stored in a memory device.

A further aspect of the present invention relates to an interface device integrated with an electricity meter, which provides the needed power for operation of the interface device. In this configuration, consumption data from the electricity meter is directly transferred to the interface device. The interface device further passes to the master station the consumption data received directly from the electricity meter and through wireless transmission from other meters.

An advantage of the invention is in providing a completely automated and reliable meter reading by an integrated system that has flexible capabilities to accommodate future enhancements and functions as desired by the user.

Another advantage is in fully electronic registers and indexes for water and gas meters that have essentially no moving parts and are capable of wireless transmission of the meter readings.

Another advantage is in providing communication means approximate to the electricity meter for receiving meter reading data from one or more of a plurality of utility meters and transmitting the collected data to a master station.

Yet another advantage is to transmit from the master station control and notification signals as well as meter reading data to the communication means which in turn may transfer the received data to additional electronic modules in the building.

A still further advantage of the invention is to integrate data collection from a plurality of meters in a master station without need for transportation and entry of reading data for each meter.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings, and in which:

FIG. 3 depicts a system for collecting and communicating multiple meters reading data in accord with the invention.

FIG. 4 shows a frame format in accord with one communication protocol used with the invention.

FIG. 5 shows a Non Network Mode Frame Format in accord with one communication protocol used with the invention.

FIG. 6 shows a Control Field Format in accord with one communication protocol used with the invention.

FIG. 7 shows a Sixteen Bit Control Field Format in accord with one communication protocol used with the invention.

FIG. 8 shows a response format for acknowledging the correct receipt of a frame in accord with the invention.

FIG. 9 shows a status field in accord with the invention.

FIG. 10 illustrates non-limiting command and response type definitions in accord with the invention.

FIG. 11 illustrates RFR-supported common and device specific command types in accord with the invention.

FIG. 12 illustrates signal timing specifications for the 2-wire mode signals depicted in FIG. 14 in accord with the invention.

FIG. 13 illustrates signal timing specifications for the 3-wire mode signals depicted in FIG. 15 in accord with the invention.

FIG. 16 illustrates unit per pulse values for an RFR in accord with the invention.

FIGS. 17(a)–17(e) illustrate the placement of the electronic circuitry in existing meter enclosure.

FIG. 18 illustrates the functional block diagram of water and gas meters integrated with wireless communication modules.

FIG. 20 shows a Direct Connect Interface in accord with an aspect of a register interface protocol of the invention.

FIG. 22 defines the fields for the Variable Format data in accord with the invention.

FIGS. 23 and 24 define measurement units and time fields in accord with an aspect of a register interface protocol of the invention.

DETAILED DESCRIPTION OF THE INVENTION

The invention relates, generally, to a meter or register integrated with a wireless communication device to permit wireless communication between the meter or register and an interface device. Various aspects of this invention and various systems incorporating this invention are discussed below.

The invention includes, in one aspect, a meter such as a solid state electricity meter (E) or water (W) or gas (G) registers with wireless communication capabilities integrated internally with a low power radio frequency (RF) communications module. Such meters are thereby configured to collect, process and transmit consumption rate of each type of utility resource (e.g., electricity, water, or gas, respectively) through sensors and communication modules to an interface device or central data box (CDB). The CDB, which may be a stand alone device or may be integrated within or adjacent a meter, is advantageously configured to support both LAN (Local Area Network) and/or WAN (Wide Area Network) interfaces.

Figure 1:
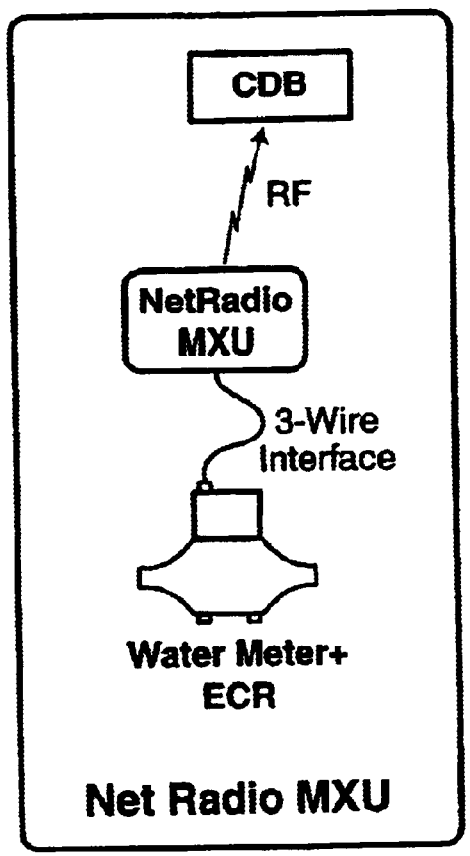
FIG. 1 illustrates a water meter and ECR connected via a 3-wire interface to a NetRadio multiplexor in accord with the invention.
Figure 2:
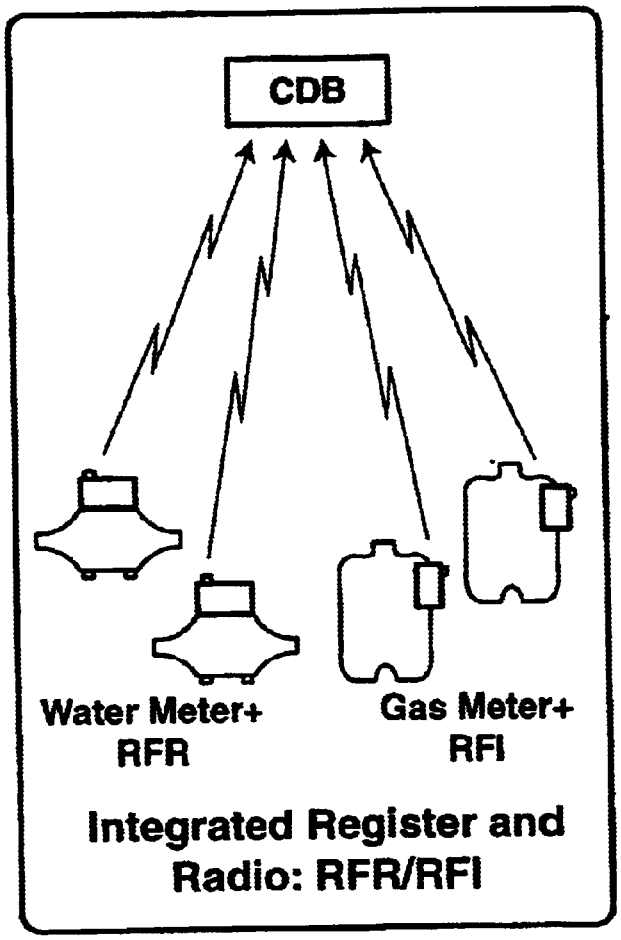
FIG. 2 shows a plurality of water meters integrated with RFR and a plurality of gas meters integrated with RFI, each meter communicating data and/or command signals via RF to or from a CDB in accord with the invention.

These general aspects of the invention are depicted in FIGS. 1–3. FIG. 1 shows a water meter and Electronic Communications Register (ECR) (a conventional water register with gears, odometers wheels, etc.) connected via a 3-wire interface to a NetRadio™ multiplexor. The Netradio™ multiplexor then communicates data and/or command signals via radio frequency (RF) to or from a CDB. FIG. 2 shows a plurality of water meters integrated with an RF Register (RFR) and a plurality of gas meters integrated with an RF Index (RFI), each of these meters communicating data and/or command signals via RF to or from a CDB. The RFR, for example, integrates an RF transmitter and a water register into a single unit.

Expanding upon these concepts, FIG. 3 shows one meter control system embodying the above described aspects of the present invention. Shown is a networked, web enabled, electronic measurement and control system that links end users and service providers to residential and commercial/industrial energy meters. FIG. 3 shows that, in one aspect of the invention involving a residential application, the solid state electric meter is itself provided with basic CDB functionality. In this aspect of the invention, the electric meter communicates via the CDB with the gas and water meters via a LAN system employing low power RF spread spectrum technology. The interface device or CDB serves as a gateway for collecting and communicating meter data to a master station via the aforementioned WAN and/or LAN, permitting bi-directional communication between the CDB and a Master Station via any conventional carrier wave or signal transmission means including, but not limited to, telephone, digital or analog cellular, two way paging, IP addressable (Internet) access, or broadband modems. In addition, each electricity meter contains communication means for receiving and transmitting meter reading data.

The CDB performs, in part, data structuring and data logging functions. In normal operation, the CDB will read and store the electric meter data from the meter (e.g., water or gas meter) microprocessor, read and store meter data (e.g., water or gas consumption data) from the RF device described herein, poll the optical interface for any incoming transmission, and read the inputs from any external devices (e.g., a reset or programming signal). If there is a transmission from the optical interface, the CDB will act upon the command received thereby.

The CDB optionally and preferably includes an optical port and a wide-area network (WAN) device, such as a telephone modem, to transmit and receive data. These interfaces are used for reading collected data, for programming, and for diagnostics. The CDB can interface to various meters, such as gas or water meters, either directly or through an RF transceiver, as described herein. The CDB preferably includes a real-time clock to permit time stamping of received data and to permit coordination of high functionality meters. The CDB should contain, at a minimum, enough memory (e.g., flash memory) for both maximum foreseeable data and program storage requirements. The maximum foreseeable data would depend on the number of attached meters, the period of transmitted and stored readings, and the update cycle. For example, in one aspect, the CDB should have enough memory to store 35 days (update cycle) worth of data for 9 gas meters, 9 water meters, and 9 electric meters, wherein the readings for each meter are transmitted hourly (period of transmission). In accord with the invention, the period of transmission may vary from about once a minute to once a day. Longer time periods may also be implemented if appropriate for the monitored system.

The communication means are capable of supporting 3rd party automatic meter reading (AMR) devices and communication with the networked system of the present invention.

To obtain water and gas consumption data register modules for use with selected existing water and gas meters utilize a register interface and low power RF transmitter to communicate meter data over the networked system. Meter communication with the networked system is via an interface device that is either integrated with the electricity meter or is a stand-alone device. The integrated solution includes a configuration that integrates the interface device, low power RF transceiver and WAN communication interface inside the meter. The other solution requires electricity meters to be equipped with an integrated low power RF transmitter for communication with an external interface device configured as a stand-alone product or combined with a network server.

The networked system uses two versions of low power RF communications modules. A transmits only version is used for integration with existing water or gas meter registers. The transceiver version is used for integration with interface devices. Electricity meters need a transmitter module if the interface device is external to the electricity meter.

The interface device acts as a gateway that collects meter and device data from electricity, water and gas meters and communicates the collected data via public wide area networks to a master station or other end users. The interface device is designed for three configurations, 1) a product that is integrated internal with the electric meter, 2) stand-alone product, and 3) a product combined with a network server. In each configuration the interface device includes modules for communicating with electric, water and gas meters via a low power RF transceiver and with end users and master station via various wireless interface modules. The interface device further includes an optional optical port and a communications port to pass data. These ports are used for receiving collected data, programming and diagnostics. Additionally, an internal clock time stamps received data that is later stored in a storage device.

The system includes a master station for collecting transmitted data and is positioned at a utility provider, service provider or any other end user location. The master station includes a communication controller and meter data management system to manage data collection operations related to all meters that are connected to the networked system. Collection of data from all the meters is accomplished by communication between the master station and installed interface devices.

Still referring to FIG. 3, additional electronic modules (S) integrated with support products communicate with the interface device through the network server (NCS) and provide capability to obtain manual meter readings, perform diagnostics and configure the various meter products for in-service use. Communication with these products will utilize an ANSI compliant optical port interface.

The interface device communicates over the WAN via telephone, cellular or broadband modems or any other wireless network with public switched networks. Internet access to the interface device enables the end users to access meter information for statistical or diagnostic applications and to provide appropriate services to the consumers. An open architecture design is used to maintain compatibility with different variations in WAN technologies.

The master station collects meter and support data in the system and serves as the focal point for maintaining both the physical system and its data collection processes. The master station supports both in-bound and out-bound communications, enabling increased functionality for collection of meter readings and support of alarm event reporting. Data collection units in the master station include computer hardware, software, data management tools and call processing systems to manage meter communications and data collection functions in relation with electricity, water and gas meters via wide area network connections. A communications controller schedules, manages and routes all communications with end point devices over the WAN or any other wireless network. The master station further includes reporting capabilities for analyzing consumption data, reporting communication performance, service interruptions, etc. Other capabilities include providing complex billing determinants, historic information for usage tracking, local and remote information display, etc. Other end users or service providers can access the collected data directly or via Internet while appropriate security measurements will be implemented to ensure the privacy and integrity of data communicated via Internet.

The software is written to provide on-air communication protocol between two microcontrollers. One preferred communication scheme is to use Frequency Shift Keying (FSK) modulation and frequency hopping. For simplicity, one scheme in accord with the invention constrains any individual message to fit into the 400 ms maximum transmission time at a single frequency, thereby removing the need for the receiver to track the transmitter across frequency changes during messages. The constituent parts of the message pack are either Manchester encoded or chose to ensure that the maximum length stationary state of the link is 2 symbols. The on-air symbol rate is 19200 baud in this aspect of the software, giving a message data rate of 9600 baud, plus control overhead.

The software consists of two complementary sets of algorithms, one operating as a transmitter, one operating as receiver. Typically, for a unidirectional data-link the transmit algorithms operate on different controllers. Optionally, a bi-directional operation both sets may be present on both processors. Each of the transmit and receive algorithms control an RF transceiver IC (integrated circuit) and associated circuitry, which implement the actual radio communication. They co-operate to move information between the transmitting and receiving controllers. For each message, this includes 3 phases of (1) discovery of a common frequency on which to communicate, (2) synchronization of symbol and data phase, and (3) data transmission.

The on-air message for preamble and synchronization includes (1) preamble sequence, (2) synchronization sequence, (3) control data, and (4) message data. The preamble sequence is selected to be simple, so as to discriminate to enable the receiver to perform rapid searches of candidate operating frequencies, such as a repeating pattern of 6 symbols (e.g., 010011 or 101100). These are the shortest length patterns that contain sufficient information to recover the phase of both the FSK and Manchester encoding. To ensure the receiver can discriminate a valid preamble sequence, the transmitter is configured to repeat the sequence a plurality of times and is required to hear a predetermined length of bits of the repeating preamble before it proceeds to the next phase of reception. Two different polarities of preamble on different bands may further be used to validate the preamble recognition.

At the end of the preamble, a synchronization word is exchanged to indicate that control data is about to be sent, and then the control data (e.g., the data message length) and then the message data are sent. The overall driver in the software implementation is to allow for the transmission of the maximum amount of data possible in the 400 ms window, while achieving the lowest possible implementation loss for the communication system as a whole. It is desirable to achieve the fastest possible frequency locking process to leave as much time as possible for the message or to allow very short transmissions so as to prolong battery life.

The software transmit algorithms carry out functions including (1) choosing a frequency on which to send the current message, (2) encoding the message for transmission (e.g., using the Manchester encoding), (3) toping the message with preamble, synchronization and control data, and (4) clocking the message packet out to the RF transceiver IC. Functions (2)–(4) operate concurrently as the message is sent with the benefit of avoiding a memory storage overhead for the encoded and prepared message.

The operating frequency is chosen in sequence from a hard coded frequency table. The table contains values of the frequency control register of the transceiver IC to avoid having to encode the actual frequencies at run time. (These register values can be chosen at time of manufacture to compensate for variations between the master clock crystal built into each radio). The actual table contains pairs of register values. Each pair consists of a FSK low and an FSK high frequency for each operating frequency. The table also contains a flag to indicate the polarity of the preamble to be used for each frequency.

The preamble, synchronization, control information and message are clocked out to the RF transceiver at the symbol rate by an interrupt service routine. A hardware timer on the host micro-controller triggers this routine.

The interrupt service routine uses a state variable to sequence the transmission of the preamble, synchronization word, control data and message data. This state variable is updated on completion of each section of the message. Upon completion of the message data section, the interrupt service routine disables the hardware timer causing its interrupt and resets its state to ready the device for the next transmission.

The preamble and synchronization data are stored as arrays of symbols. The interrupt service routine uses counting variables to index the symbols and count out the preamble repeats. In the Manchester encoding, bits of the control and message data are Manchester encoded into pairs of symbols every other symbol during message data transmission. Pairs consist of either 1, 0 or 0, 1 depending upon the value of the message data bit. The receive algorithms scan through the available operating frequencies seeking out a preamble sequence. If a valid sequence is identified the receiver stops scanning and waits for a synchronization sequence, then control data is received, followed by the message data. Both the control data and message data are Manchester decoded.

If in any part of the reception process the receiver identifies bogus data of any form it resets, and resumes scanning. Bogus data is identified either through edge timing integrity checking or through state transition identification of the preamble and synchronization sequences.

The receive process is driven by edges in the data from the RF transceiver IC. A hardware timer measures the edge timing, and the edges trigger an interrupt service routine. The interrupt service routine contains all the code necessary to receive the message, including timing integrity checks, preamble and synchronization data state machines and a Manchester decoder. The routine is written so that it can execute to completion in a fraction of a symbol period with the host processor running on the 5 MHz clock specified.

The data stream from the RF transceiver should be valid Manchester encoded information, meaning that within constraints of clock frequency, phase drift and symmetry the timing of edges is known. Algorithms may then be employed to track and measure these parameters and identify bogus edges. The level of data line is checked after the execution of the interrupt overhead. If the data line equals the logic level opposite the level of the previous state, the edge is accepted as valid. Otherwise, the edge is discarded by immediate termination of the interrupt routine. The basic functionality of the edge tracker is intelligent clock recovery of the edges. The edge tracker uses the timing of received edges to predict the temporal location of future edges using, in one aspect, the averaged communication rate (e.g., 19200 baud). Further, deviation in the timing of any given edge is assumed to be independent of any previous or future edges. This independence produces a negative correlation between the inter-edge intervals surrounding the deviating edge.

If a single edge falls early in a perfectly timed series of edges, the interval preceding the edge will be shorter than nominal while the succeeding interval is equally longer. The reverse applies to late edges. To adjust for temporally mis-aligned edges, the tracker computes the amount of time, which an edge deviates from its expected temporal position. A value proportional to this deviation is added to the expectation of the following edge. Hence, upon the reception of an edge the tracker updates an estimate of the expected interval to the next edge. The value added to the expectation is "proportional" to the computed deviation, not the deviation itself. Adding the full deviation may cause the tracker to enter an unstable state, which would produce erroneous results. Instead, the deviation is multiplied by a factor in the range 0.1. In one preferred aspect of the invention, a factor of 0.5 is used.

The adjusted inter-edge intervals produced by the tracker are classified as corresponding to 1 or 2 symbols, intervals are not classified as erroneous based exclusively on their duration. A time-out function will eliminate intervals greater than 3 symbols.

The interrupt service routine uses a state variable to keep track of the part of the on-air message that it is working on. Completion of each section of the message causes the state machine to move into the next section, or to reset if reception is complete. Errors in the data for either the preamble or the sync cause the state machine to reset, and the receiver to return to the next candidate frequency.

Preamble detection is achieved using a state machine that matches the expected polarity of the preamble pattern 010011 or 101100. The state machine throws an error if any symbol is incorrect, and can only exit, allowing the receiver to proceed onto the sync detection at the end of a pattern and if a sufficient number of patterns has been observed. The state machine cycles one way around for one polarity, and in reverse for the other. After preamble detection the receiver starts collecting symbols. Once it has collected enough symbols for a sync sequence it checks and throws an error if any symbols were incorrect. The receiver then starts collecting pairs of symbols and Manchester decoding them into bits. The first byte received must be an 0x0D as per the radio specification, thereafter the receiver collects the length of the message data. Finally, the message data is collected and stored in a received data array.

The aforementioned software is but one possible protocol. Other communication protocols may also be implemented in accord with the invention to enable efficient RF or carrier wave communication.

For example, another communication protocol in accord with the invention, described below, enables serial communications with the RF Register (water) and RF Index (gas) and includes protocols for both the unidirectional and bi-directional forms of communication with the register.

As used in this example of a communication protocol, general definitions of the following terms are provided for illustration. A command field is the field in the information portion of a frame that determines the action to be performed. Not all "commands" fit the strict definition of the word. The term is used here to identify the portion of the frame that indicates the action to be taken.

A command data unit (CDU), shown in FIG. 4, consists of the command type and command data, if any. A command data unit may span more than one frame. A frame, shown in FIG. 5, consists of the Start byte, Length byte, Control Field, Information and Checksum word. The first character in the bi-directional message is the start character. This is one byte and is defined as hex 0D. The length field is the second field in the message. The length field is eight-bits with a maximum value of 254. The message length begins with the control field and includes the checksum. The device documentation shall determine the maximum frame size. The control field is the third field in the message. The control field is one or two bytes in length. The Long Flag, defined in FIG. 6 determines the length. The bit format for the control field is defined below. The bits are defined in the following sections.

The multiple frame flag is a single bit used to indicate a multiple frame message. If this flag is set to '1' then more frames are to follow in this message. If the flag is set to '0' then no more frames are to follow. The long flag is a single bit used to indicate the length of the control field. If this flag is set the control field will be sixteen bits long as shown in FIG. 7. Presently, the lower eight bits are reserved for future use. The multiple command flag is a single bit used to signal that the message contains more than one command. If the flag is set to '0' then there is only one command in the message. If the flag is set to '1' then the message may contain more than one command. The network flag is a single bit used to indicate the network mode of operation is being used. The response flag is a single bit used to determine whether a response will be given for each message. If the flag is set to '1' the unit receiving the message will send a response message. If the response flag is set to '0' no response will be sent, even if data was requested. The response format is defined later. All devices must support the response flag.

The three least significant bits in the control word shall indicate the encryption type used. Currently the only valid pattern for the encryption bits is '000', no encryption, although data encryption schemes are considered advantageous to the invention and conventional data encryption schemes are included within the scope of the invention. The lower eight bits of the sixteen-bit control word are reserved for future use. The lower eight bits are included only if the Long Flag is set to '1'. This field contains the error checksum for the message and is two bytes in length. The checksum will be sent high byte first. The checksum shall be calculated by summing all the bytes in the message including the start byte, excepting the checksum bytes.

Regarding the bi-directional interface message command information format, the information format for a single command message is shown in FIG. 5. Each command consists of a command type field and the command data. These bytes are collectively referred to as a command data unit, CDU.

The command type is defined as a one-byte field that indicates the action to be performed. The value 255 decimal (FF hex) is defined as a command extension. The byte following 255 will be the command byte. The common commands are defined later. The command data consists of information necessary for the implementation of a command. Some commands will not require any additional data. The command data will sometimes contain floating point numbers. Advantageous formats for these numbers include the following defined formats for floating point numbers: five byte BCD, nine byte BCD, five byte binary, and nine byte binary. The first byte in each format is divided into two parts, the mantissa sign and the exponent. The most significant bit in the first byte represents the sign of the mantissa, a zero indicates positive and a one indicates negative. The lower seven bits in both BCD and both binary formats represents the exponent in two's complement notation. The exponent will represent powers of ten for the BCD formats and powers of two for the binary formats. The radix point occurs between the first byte (mantissa sign and exponent byte) and second byte in all representations. The numbers should be normalized but a leading one is not assumed. For example, the decimal number 358 is represented using the five byte BCD representation as: 00000011 00110101 10000000 00000000. The same number is represented in five byte binary representation as: 00001001 10110011 00000000 0000000. The decimal number 0.125 is represented using five byte BCD representation as 00000000 00010010 01010000 00000000. The same number is represented in five byte binary representation as: 01111010 10000000 00000000 00000000.

FIG. 8 shows a response format for acknowledging the correct receipt of a frame. Each command sent requires a response consisting of a status byte and data requested by the command, if applicable. The status field is a one-byte field indicating the result of the command. The status field is defined in FIG. 9. A status of WAIT, decimal 254 (hex FE), indicates that the slave has not yet completed the command.

The response data is defined as the data sent in response to a command. Some responses will not include any data. For example, the response to Set Factory ID will contain a status byte and no data. The response must be sent within three seconds of the last frame of the message. If the command(s) require more than three seconds to complete, a response with type WAIT (See table one) must be issued. A timeout of 30 seconds will follow a status of WAIT. Successive WAIT messages are allowed. There are three main types of response messages, single-frame commands, multi-frame response message frame acknowledgement from a slave and frame acknowledgement from a master. If the response flag is set, response messages will always be sent. If the response flag is not set, no response will be sent even if data was requested. The master should insure that the response flag is set in messages that request data and also in multiple frame messages. A response message will be sent after a single frame command message. The use of this response acknowledges the correct receipt of the frame, indicates the command is complete and includes any requested data. If the frame received has a checksum error the response status field in the response message will be Message Corrupt (FD hex).

The frame acknowledgement in a multi-frame message sequence will be a response message with the status field indicating whether the message was correctly received. This will usually be either 'Frame received, no error' (hex FC) or 'Corrupt Message' (hex FD). For example a corrupt frame would have a status byte set to 'message corrupt' (hex FD). A correct frame would have a status byte set to 'Frame received, no error' (hex FC). The response sent after the last frame in a multi-frame message will be a 'normal' response having the appropriate status. Lastly the master will acknowledge a multi-frame response message by sending a response message having command type Frame Result and followed by a status byte indicating the status of the frame. Here the response message is used in place of the ACK/NAK scheme. All single frame response messages should have the response flag cleared to avoid confusion. If the data is corrupt the master can simply request the data again. This will simplify the protocol on the slave side.

The above-described protocol includes a scheme for acknowledging the receipt of frames. If a frame is corrupt the receiving device will send a response message with a status indicating the frame was not correctly received. In general the devices should use a "three times and quit" algorithm. If the frame is received and has data errors, the most likely cause is noise. If the noise is constant then sending the frame more than three times will probably not help. If the message was incorrectly formatted then the algorithm will prevent an endless loop. If the master is the sending device and the slave device sends a response indicating the frame was received in error or if no response is received within three seconds, the master should try two more times. If there is no success after three tries the master should stop. If there was no response from the slave during the attempts the master should exit and reenter bi-directional mode. If the master was trying to send a multi-frame message the whole message should be aborted. On the receiving end the slave should abort the message after three unsuccessful attempts to receive a frame and return to the state of looking for a command message. If the slave device is the sending device, in a multi-frame response, and the master replies indicating the frame was in error the slave shall try two more times. If there is no success after three tries the slave shall stop and the whole message shall be aborted. This will prevent any slave device from entering an endless loop.

Exemplary non-limiting command and response type definitions are illustrated in FIG. 10. The documentation for each device is responsible for defining the types that are implemented in the product as well as the valid range for the command data. There are two required commands for all devices that use bi-directional communications. The View Version and Type command should be implemented on every bi-directional device. This will allow the master to determine which device is being interrogated. The Set Factory ID command and the Set Programmable ID command are recommended commands for all Sensus registers. The format for each command is described in the following sections. Note that the maximum length for all strings defined in the followings sections does not include the NULL terminator.

The View Factory ID command shall cause the slave device to transmit the factory ID. The CDU shall consist of the command byte. The slave device shall respond by sending a message containing a status byte followed by the ASCII ID string terminated by a NULL character. The Set Factory ID command shall set the device ID. This command shall only be executed at the factory. The CDU shall consist of the one-byte command field followed by one to twelve ASCII alphanumeric characters. The ID shall be NULL terminated. The length of the ID string is device dependent. The View Programmable ID command shall cause the slave device to return the customer ID. The CDU shall consist of the command byte. The slave device shall transmit a message block containing a NULL terminated ASCII string representing the customer ID. If the ID is NULL, a single NULL character (hex 00) shall be returned in the response string.

The Set Programmable ID command shall set the customer ID in the slave device. The CDU shall consist of the one byte command code followed by a NULL terminated ASCII string of 1–20 alphanumeric characters. The ID shall be cleared and set to NULL if this command is sent with a string consisting of a single NULL (hex 00) character. The View Version and Type command is used to determine the type of device being programmed. The CDU shall consist of the command byte. The slave device shall respond by sending data containing the protocol version, device type and software version. The format of the data is three comma-delimited strings with a single NULL terminator. Each string consists of a maximum of eight characters. The three strings are discussed below.

The protocol version string defines the version of the bi-directional protocol supported by the device being interrogated. The string shall contain a maximum of eight printable ASCII characters. The current bi-directional protocol string is "B1.00". This may change in future releases of the specification and a table will be added indicating specification versions and the corresponding protocol string. The device type string identifies the device being interrogated. The string shall contain a maximum of eight printable ASCII characters. The string shall be defined by the device documentation but should have the general format of the existing device types, i.e. MIU205, MXU550.

The software version string identifies the revision of software contained in the device being interrogated. The string shall contain a maximum of eight printable ASCII characters. The string shall be defined by the device documentation but should have the general format "XX.YY" where XX defines the major revision and YY the minor revisions. The View Customer Text command shall cause the slave device to return a string containing the customer text field. The CDU shall consist of the command byte. The slave device shall transmit a message block containing a NULL terminated ASCII string representing the customer text field. If the ID is NULL, a single NULL character (hex 00) shall be returned in the response string.

The Set Customer Text command shall set the Customer Text field in the slave device. The CDU shall consist of the one byte command code followed by a NULL terminated ASCII string of 1–20 alphanumeric characters. The Customer Text field shall be cleared and set to NULL if this command is sent with a string consisting of a single NULL (hex 00) character. The View Reading Digits command shall cause the slave device to return the number of reading digits. The CDU shall consist of the command byte. The slave device shall transmit a message block containing two binary numbers that represent the number of reading digits. The first number represents the total digits in the reading. The second number represents the number of digits to the right of the decimal point.

The Set Number of Reading Digits command shall set the number of reading digits in a register. The CDU shall consist of the one-byte command code followed by two binary numbers. The first number represents the total number of digits in the reading string. The second number represents the number of digits to the right of the decimal point. The View Reading Units command shall cause the slave device to return the reading units. The CDU shall consist of the command byte. The slave device shall transmit an eight bit binary number representing the reading units.

The Set Reading Units command shall set the reading units for the slave device. The CDU shall consist of the one-byte command code followed by an eight bit binary number representing the reading units. The View Rate Units command shall cause the slave device to return the rate units. The CDU shall consist of the command byte. The slave device shall transmit two bytes representing the rate units. The first byte represents the totalization units and the second byte represents the time units.

The Set Rate Units command shall set the rate units for the slave device. The CDU shall consist of the one byte command code followed by two eight bit binary numbers representing the rate units. The first byte represents the volume units and the second byte represents the time units. The View Reading Resolution command shall cause the slave device to return the resolution setting for the reading. The CDU shall consist of the command byte. The slave device shall respond by sending a signed eight bit binary number representing the reading resolution in powers of ten.

The Set Reading Resolution command shall set the slave device resolution for the reading. The CDU consists of the command byte followed by a signed eight bit binary number representing the reading resolution in powers of ten. The View Rate Resolution command shall cause the slave device to return the resolution setting for the rate. The CDU shall consist of the command byte. The slave device will send a response message with a signed eight bit binary number representing the rate resolution in powers of ten. The Set Rate Resolution command shall set the slave device resolution for rate. The CDU consists of the command code followed by a signed eight bit binary number representing the rate resolution in powers of ten.

The View Reading Preset command shall cause the slave device to return the preset reading value. The CDU shall consist of the command byte. The slave device shall return a message block containing a NULL terminated ASCII string of one to eight characters. The Set Reading Preset command shall send the value to be used as the initial reading. The CDU consists of a one-byte command code followed by a NULL terminated ASCII string of one to eight characters representing the preset reading value. This value is assumed to be in the current units used for totalization. The View Reading Mode command shall cause the slave device to return the current value of the reading mode. The CDU shall consist of the command byte. The slave device shall return a message block containing one byte binary number representing the reading mode.

The Set Reading Mode command shall set the unidirectional reading mode in a register. The CDU shall consist of the command byte followed by a one byte binary number. The number represents the unidirectional reading mode setting. A zero represents the minimal reading string and a one represents the extended reading string. The Device Specific command is used to indicate that the command is not a common command but specific to a device type. The format for the CDU is the command byte followed by one or bytes indicating the command, followed by the command data. The Frame Acknowledge command is used by the master to acknowledge a frame in a multi-frame message. The CDU consists of the command byte followed by a one-byte status as defined in table one. The response flag should be cleared when sending this command. The Extended Command will be used to extend the command set when the one-byte commands are exhausted. This command is not currently used.

Examples of message exchanges in accord with the above described format follow. Each example is presented with the master device (i.e. SSI) sending a command to a slave device (i.e. EWR).

In the first example, messages sent when setting the customer ID on an EWR:

MASTER: 0x0D 0x0D 0x08 0x04 0x31 0x30 0x30 0x30 0x30 0x30 0x30 0x31 0x00 <CHKSUM>

(Master sends Set Programmable ID command (0x04))

SLAVE: 0x0D 0x04 0x00 0x01 <CHKSUM>

(Slave receives message, checks checksum and executes command successfully. Status message with response type Set Customer ID (hex 04) is then sent)

The second example shows an attempt to execute an illegal command (0xF0, currently undefined) on an Omnimeter register MASTER: 0x0D 0x04 0x08 0xF0 <CHKSUM>

(Master sends illegal command (0xF0))

SLAVE: 0x0D 0x04 0x00 0x03 <CHKSUM>

(Slave checks checksum, but does not recognize command and sends status 0x03)

However, some constraints may apply to the frame format for the RFR bi-directional commands described above. In the above embodiment, the maximum supported frame length for the RFR is 64 bytes and Encryption Bits are not supported by the RFR. The RFR will send an "Error, unsupported control bit pattern" message if any of the encryption bits are set. The Response Flag will be supported by the RFR, but the programming device must set the response flag during "View" commands in order to receive a response from the register. The Network Flag will not be supported by the RFR. If the network flag is set, the RFR will not send a response. This will prevent data collisions on the network. The Multiple Command Flag will not be supported by the RFR. Only one command can be issued per message since the multiple command flag is not supported. The RFR will send an "Error, unsupported control bit pattern" message if the multiple command flag is set. The Long Flag will not be supported by the RFR. Only 8-bit control fields will be supported. The RFR will send an "Error, unsupported control bit pattern" message if the long flag is set. The Multiple Frame Flag will not be supported by the RFR. Data transmission will be limited to one frame in each direction. The RFR will send an "Error, unsupported control bit pattern" message if the multiple frame flag is set.

Significantly, the present invention provides programming of the RFR or RF configured meter. Below are described commands used to view and change the programmable parameters on, for example, the RFR. The RFR will support common command types and RFR device specific command types. Common commands consist of a single byte command type in the information field of the frame. The RFR device specific commands consist of a two-byte command type in the information field of the frame. The first byte is the hex value 0xFD, indicating that a device specific command is to follow. The RFR-supported common and device specific command types are listed in FIG. 11, which are described in greater detail below.

The View Factory ID command requests the register to transmit the factory set ID. The message data from the programming device will consist of a one-byte command field. The register shall respond by sending a bi-directional-formatted string with message data containing a status byte followed by the ASCII ID string terminated by a NULL character. The Set Factory ID command shall set the register ID. This command shall only be executed at the factory. The message data from the programming device will consist of a one-byte command field followed by 1–12 ASCII alphanumeric characters. The ID shall be NULL terminated. The View Programmable ID command requests the register to transmit the programmable ID. The message data from the programming device will consist of a one-byte command field. The register shall respond by sending a bi-directional-formatted string with message data containing a status byte followed by the programmable ID ASCII data terminated by a NULL character. If the programmable ID is NULL, a single NULL character shall be returned in the response string.

The Set Programmable ID command shall set the programmable ID. The message data from the programming device will consist of a one-byte command field followed a NULL terminated ASCII string of 1–12 alphanumeric characters. The programmable ID shall be set to NULL if this command is sent with a single NULL character. The View Version and Type command requests the register to transmit the type of device that is being programmed. The message data from the programming device will consist of a one-byte command field. The register shall respond by sending a bi-directional-formatted string with a status byte and message data containing the protocol version, device type and software version. This string will be NULL terminated. The format of the data is three comma-delimited strings. Each string consists of a maximum of eight characters. A response example for the RFR is: B1.00,RFR600,1.01.

Where the first field indicates bi-directional protocol version, the second field is the device type and model number, and the third field is the software version. This command may also be referred to as the ENQ, or enquiry, command. The View Customer Text command shall cause the slave device to return a string containing the customer text field. The CDU shall consist of the command byte. The slave device shall transmit a message block containing a NULL terminated ASCII string representing the customer text field. If the ID is NULL, a single NULL character (hex 00) shall be returned in the response string.

The Set Customer Text command shall set the Customer Text field in the slave device. The CDU shall consist of the one byte command code followed by a NULL terminated ASCII string of 1–14 alphanumeric characters. NOTE: The Customer Text field in the RFR is limited to 14 characters. The Customer Text field shall be cleared and set to NULL if this command is sent with a string consisting of a single NULL (hex 00) character. The View Number of Reading Digits command shall cause the register to return the number of reading digits that is stored in RFR memory. The message data from the programming device will consist of a one-byte command field. The register shall return a bi-directional-formatted string with a status byte and message data containing two binary numbers, the first binary number being the total number of reading digits and the second binary number being the number of digits to the right of the decimal point in the reading. The first binary value returned should be between four and eight and the second binary value returned by the RFR will always be "00". The RFR supports 4–8 reading digits and fractional kilowatt hours are not supported.

The Set Reading Resolution command shall send the number of digits to display in the reading field to the register. The message data from the programming device will consist of a one-byte command field, followed by two binary numbers, the first binary number being the total number of reading digits and the second binary number being the number of digits to the right of the decimal point in the reading. Valid binary values for the first number are 04–08 and the second binary value must always be 00. The RFR supports 4–8 reading digits and fractional kilowatt hours are not supported. The View Reading Resolution command shall cause the slave device to return the resolution setting for the reading. The CDU shall consist of the command byte. The slave device shall respond by sending a signed eight bit binary number representing the reading resolution in powers of ten. The Set Reading Resolution command shall set the slave device resolution for the reading. The CDU consists of the command byte followed by a signed eight bit binary number representing the reading resolution in powers of ten.

The Set Reading Mode command shall send a binary number representing the unidirectional reading mode to the register. The message data from the programming device will consist of a one-byte command field, followed by a binary number: the reading mode. Valid binary values for the reading mode are 00 and 01. When the reading mode is 00 the RFR supports the typical format of the unidirectional string and when the reading mode is 01 the RFR supports the expanded format of the unidirectional string. The View Reading Resolution command shall cause the slave device to return the resolution setting for the reading. The CDU shall consist of the command bytes. The slave device shall respond by sending four bytes representing the chamber constant. The Set Chamber Constant command shall set the register chamber constant. The CDU consists of the command bytes followed by four bytes representing the chamber constant. The View Status Byte command shall cause the slave device to return the status byte. The CDU shall consist of the command bytes. The slave device shall respond by sending two eight bit binary number representing the status.

The Set Status Byte command shall cause the register to set or reset the appropriate bits in the status bytes. The CDU consists of the command bytes followed by two bytes representing the status bytes. The View Hop Sequence Command shall cause the register to send a message containing the frequency hop sequence. The CDU shall consist of the command bytes. The slave device shall respond by sending fifty binary numbers with each number representing the EEPROM location containing a frequency value. The value an EEPROM location may be obtained by using the View Frequency Command.

The Set Hop Sequence command shall cause the register to load the hop sequence from the message into the EEPROM. The CDU consists of the command bytes followed by fifty bytes representing the hop sequence. The View Hop Sequence Command shall cause the register to send a message containing the frequency hop sequence. The CDU shall consist of the command bytes. The slave device shall respond by sending fifty binary numbers with each number representing the EEPROM location containing a frequency value. The value an EEPROM location may be obtained by using the View Frequency Command. The Set Hop Sequence command shall cause the register to load the hop sequence from the message into the EEPROM. The CDU consists of the command bytes followed by fifty bytes representing the hop sequence.

The View Next Frequency Command shall cause the register to send a message containing the sequence number. The CDU shall consist of the command bytes. The slave device shall respond by sending a one-byte number with a range of 0–49 representing the sequence number of the next frequency to be used for transmission. The Set Next Frequency command shall cause the register to set the index to the value contained in the message. The CDU consists of the command bytes followed by one byte representing the sequence number. The View Transmit Interval Command shall cause the register to send a message containing the transmit interval. The CDU shall consist of the command bytes. The slave device shall respond by sending a two-byte number representing the number of seconds between RF transmissions.

The Set Transmit Interval command shall cause the register to set the transmit interval to the value contained in the message. The CDU consists of the command bytes followed by two bytes representing the transmit interval. The View Transmit Variation Command shall cause the register to send a message containing the transmit variation value. The CDU shall consist of the command bytes. The slave device shall respond by sending a one-byte number representing the number of seconds of random variability in the RF transmission interval. The Set Transmit Variation command shall cause the register to set the transmit variation to the value contained in the message. The CDU consists of the command bytes followed by one byte representing the transmit variation.

The View Battery Test Enable Command shall cause the register to send a message containing the value of the battery test enable. The CDU shall consist of the command bytes. The slave device shall respond by sending a one-byte number with the value of the battery test enable variable. A value of zero indicate the battery test function is disabled while a value of one indicates the battery test function is enabled. The Set Battery Test enable command shall cause the register to set the battery test enable to the value contained in the message. The CDU consists of the command bytes followed by one byte representing the battery test enable setting. A value of zero disables the battery test function while a value of one enables the battery test function.

The View RF Protocol Type Command shall cause the register(to send a message containing a number representing the RF protocol type. The CDU shall consist of the command bytes. The slave device shall respond by sending a one-byte number representing the RF protocol type. The Set RF Protocol Type command shall cause the register to set the RF Protocol Type to the value contained in the message. The CDU consists of the command bytes followed by one byte representing the RF Protocol Type. Currently, the only valid setting for the RF protocol type is zero. The View RF Power Level Command shall cause the register to send a message containing the value of the RF Power Level. The CDU shall consist of the command bytes. The slave device shall respond by sending a one-byte number with the value of the RF Power Level variable. Valid settings for the RF Power Level are zero through seven.

The Set RF Power Level command shall cause the register to set the RF Power Level variable to the value contained in the message. The CDU consists of the command bytes followed by one byte representing the RF Power Level. Valid settings for the RF Power Level are zero through seven. The View RF Frequency Value Command shall cause the register to send a message containing the value of an RF Frequency location. The CDU shall consist of the command bytes followed by a one-byte number representing the location (0–49) of the desired RF Frequency value. The slave device shall respond by sending an nine-byte number representing the location and the frequency value contained in that location. The first byte is the location number while bytes 2–5 represent the lower RF frequency setting and bytes 6–9 represents the upper RF frequency setting.

The Set RF Frequency Value command shall cause the register to set the RF frequency to the value contained in the location specified. The CDU consists of the command bytes followed by nine bytes representing the location and the value. The first byte is the location number while bytes 2–5 represent the lower RF frequency setting and bytes 6–9 represents the upper RF frequency setting.

In accord with the above command descriptions, below are provided examples of bi-directional messaging using the above communications format, including the data message format. A typical bidirectional communications session between a programming device and the register may be as follows: (1) Programmer sends command to set the programmable ID; (2) Register responds with a status concerning the received message; (3) Programmer sends command to read the programmable ID; (4) Register sends the programmable ID.

The actual strings that shall be transmitted to perform the above session will be shown below. All strings are transmitted in hexadecimal format.

Programmer sends command to set the programmable id.

Set the programmable ID to "111122223333".

String sent from the programmer to the register:
"0D110804313131323232323333333300<checksum>"

For readability, after inserting commas between each byte, the string will look like:

0D,11,08,04,31,31,31,31,32,32,32,32,33,33,33,33,00, <checksum> where:
- 0D—start byte
- 11—length field, (in hex) string from control to checksum, inclusive
- 08—control field, only response flag set
- 04—command type=set programmable ID
- 313131313232323233333333300—command data= programmable ID data
- <checksum>—16 bit from start to end of message data, inclusive After detecting a bi-directional communications session, the register will read the string, check for the start byte and verify the length and checksum. If the checksum is valid, the data will be written to memory and a command complete status will be written to the programming device. Any error condition will be identified in a status message to the programming device, without any changes to the memory.

String sent from the register to the programmer:
"0D040001 <checksum>"

For the purpose of discussion, after inserting commas between each byte, the string will look like:

0D,04,00,01,<checksum> where:
- 0D—start byte
- 04—length field, (in hex) string from control to checksum, inclusive
- 00—control field, no bits set (no response required)
- 01—status; command complete, no errors
- <checksum>—16 bit from start to end of message data, inclusive After receiving the command complete status, the operator of the programmer should verify that the field that was programmed correctly by reading the contents of that same field.

Read the programmable ID.

String sent from the programmer to the register:
"0D040803<checksum>"

For the purpose of discussion, after inserting commas between each byte, the string will look like:

0D,04,08,03,<checksum> where:
- 0D—start byte
- 04—length field, (in hex) string from control to checksum, inclusive
- 08—control field, only response flag set
- 03—command type=read programmable ID
- <checksum>—16 bit from start to end of message data, inclusive After detecting a bi-directional communications session, the register will read the string, check for the start byte and verify the length and checksum. If the checksum is valid, the data will be transmitted to the programming device with a command complete status.

String sent from the register to the programmer:
"0D11000131313131323232323333333300<checksum>"

For the purpose of discussion, after inserting commas between each byte, the string will look like:

0D,10,00,01,31,31,31,31,32,32,32,32,33,33,33,33,00, <checksum> where:
- 0D—start byte
- 10—length field, (in hex) string from control to checksum, inclusive
- 00—control field, no bits set (no response required)
- 01—status; command complete, no errors
- 3131313132323232333333300—response data= programmable id data <checksum>—16 bit from start to end of message data, inclusive Turning to the physical layer specifications for bi-directional communications on two and three wire interfaces, wherein the Master may comprise an interrogating device such as an SSI, an MIU or an MXU and a Slave device providing the reading may comprise an ECR or MIU. Bi-directional Communications includes half-duplex communications between a master and slave allowing data to be transmitted in both directions using either a 2 or 3 wire interface and Unidirectional Communications include communications in which data flows in only one direction, from a slave to a master, such as the TouchRead™ interface is an example of this. Thus, in the bi-directional protocol the master device (e.g., an SSI) will use the bi-directional protocol to send parameters to the slave device (e.g., an electronic register) or request specific data not usually found in the encoded reading (unidirectional).

An example of the need for bi-directional communications is a register with a programmable customer defined ID. The system would operate in the following manner. First, the master device applies the Power/Clock signal to the slave. In order to establish the reference time, all clock low times sent before the slave begins to transmit must be a Data 1($T_{S1}$). Second, the slave device starts transmitting data as in unidirectional mode. Third, the slave device establishes clock low timing thresholds for data 0 and data 1 by either: 1) Measuring the first clock low pulse time after the first start bit transmitted by the slave and using the percentages and signal timing specifications in FIG. 12 or 2) Using the maximum and minimum values listed in FIG. 12 or 13. Fourth, the master device starts transmitting the message containing the Customer defined ID to the slave. The data is transmitted by controlling the width of the clock low time as explained in the next section. Fifth, once the message from the master is complete the slave responds in a manner defined by above. Seventh, the slave remains in bi-directional mode waiting for more commands from the master until power is removed from the interface.

Figure 14:
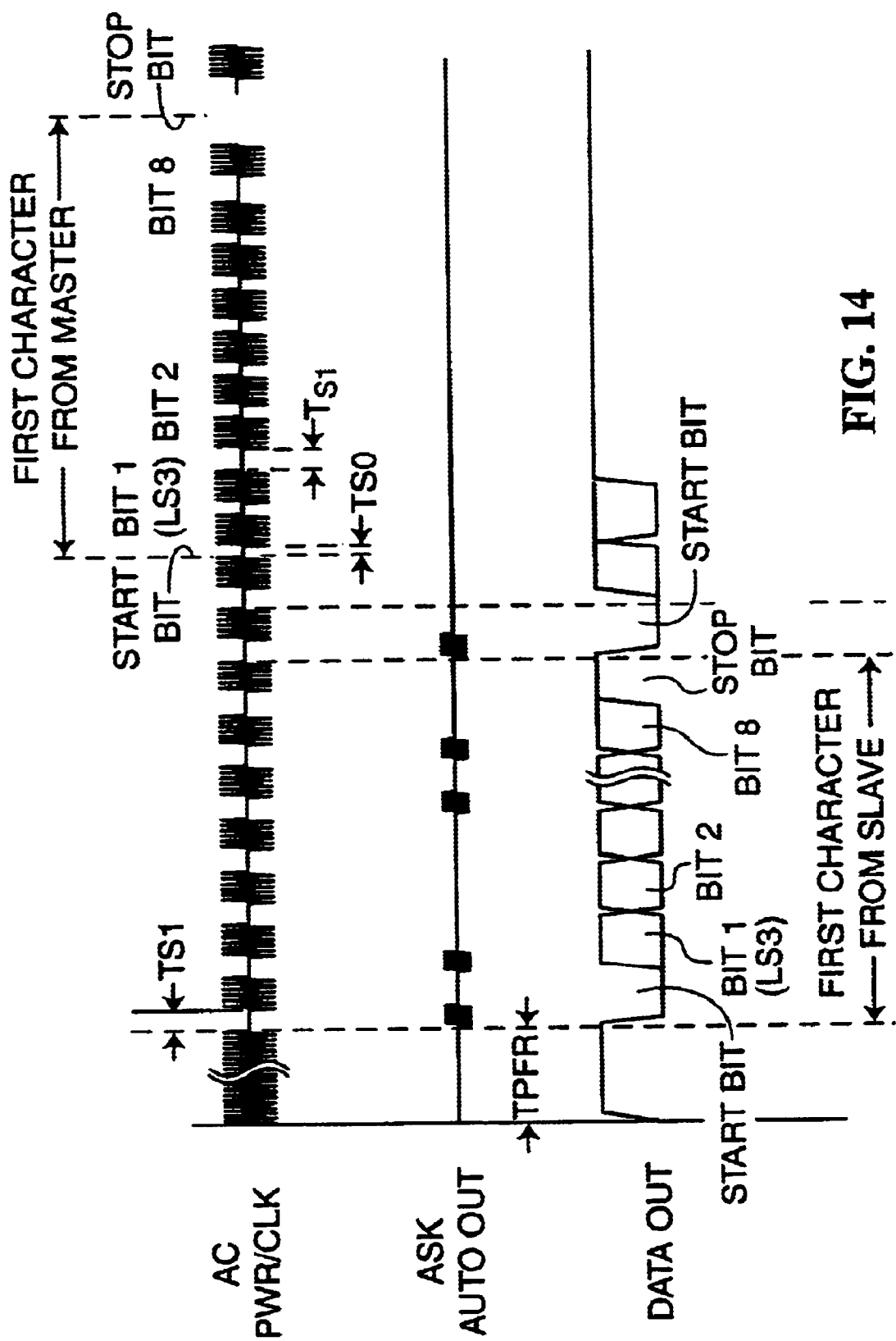
FIG. 14 illustrates 2-wire mode signals in accord with the invention.
Figure 15:
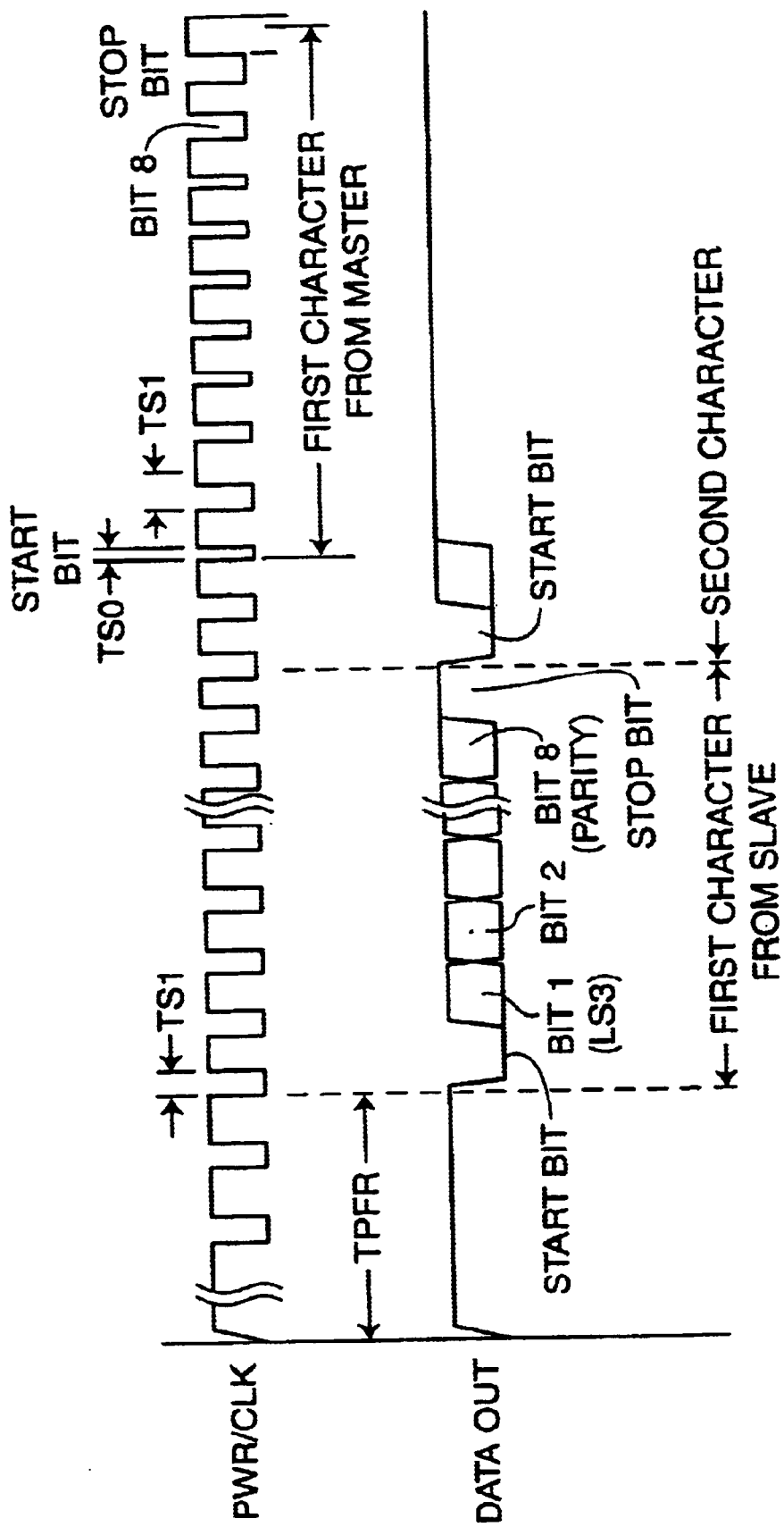
FIG. 15 illustrates 3-wire mode signals in accord with the invention.
Figure 19A:
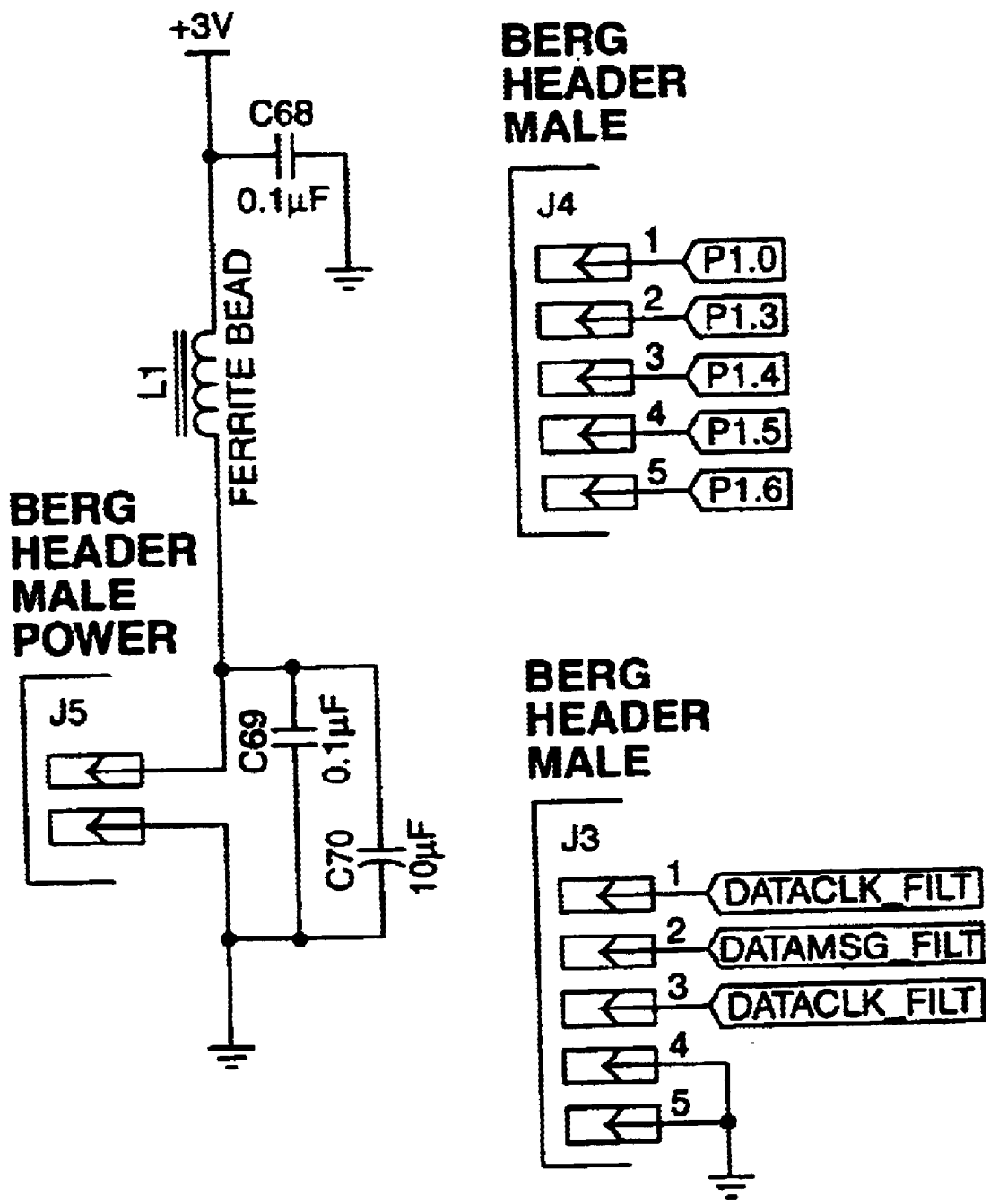
FIGS. 19(a)–19(g) are a schematic of an RF portion chip implementable in accord with the invention.
Figure 19B:
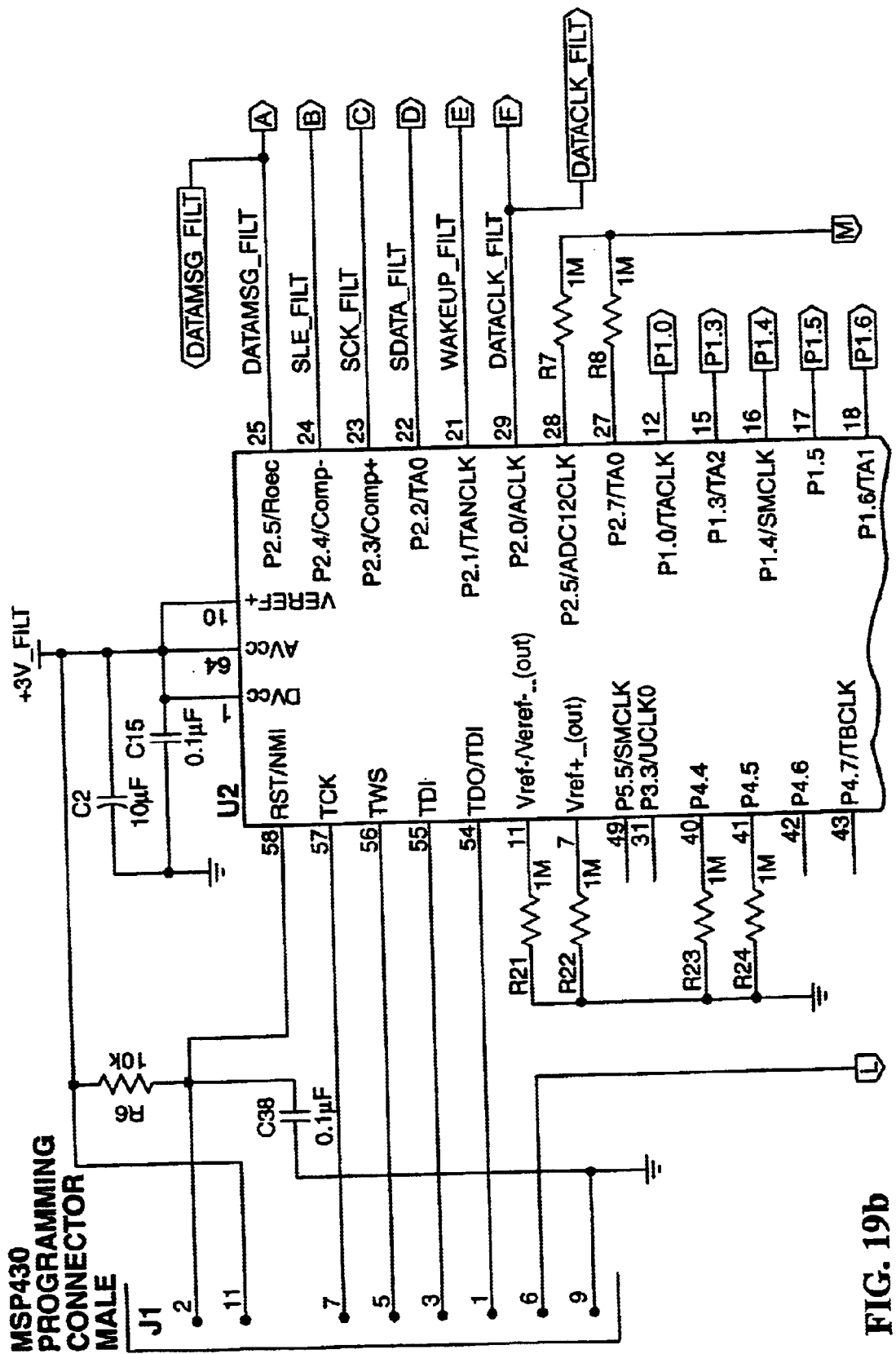
Figure 19C:
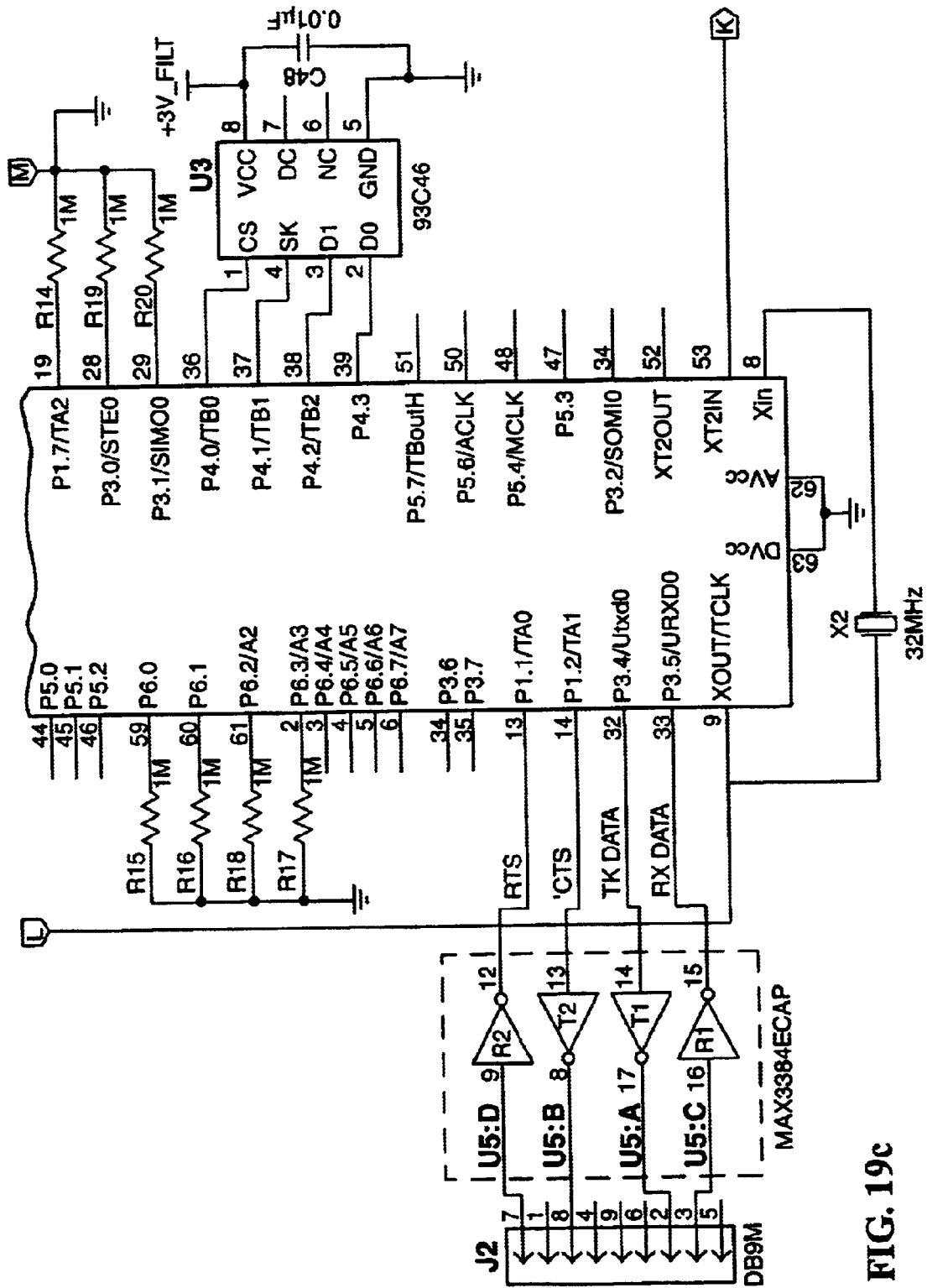
Figure 19D:
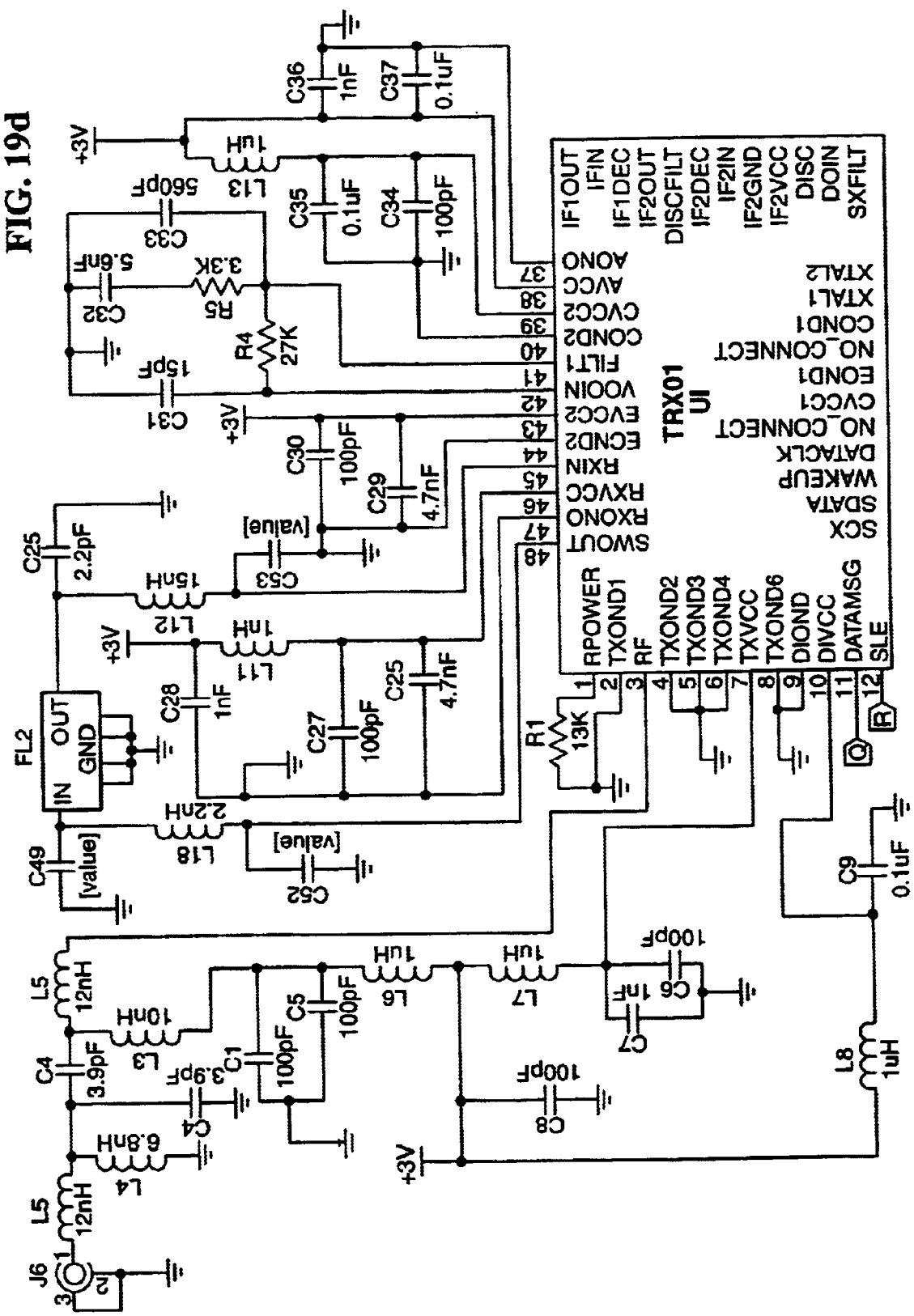
Figure 19E:
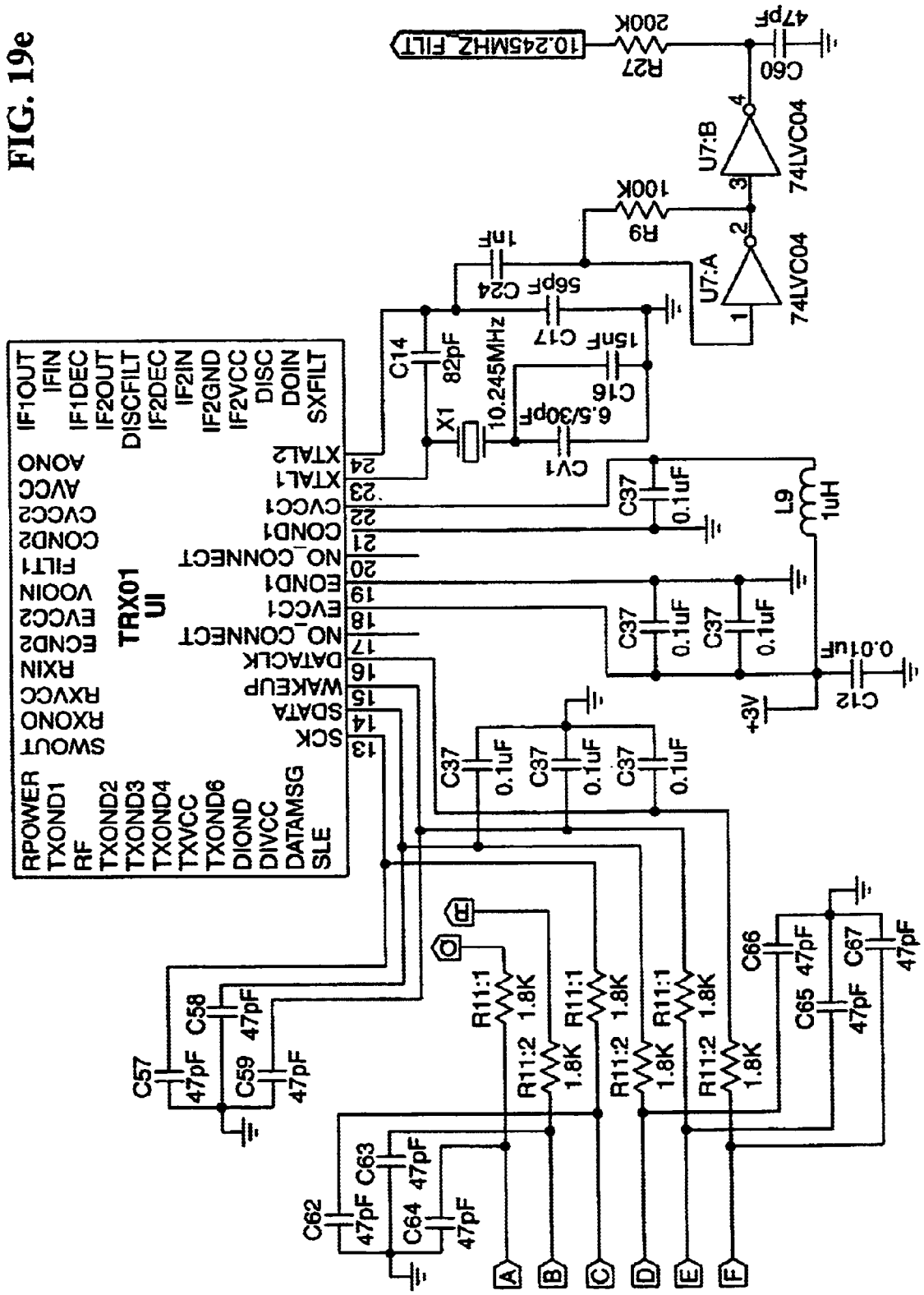
Figure 19F:
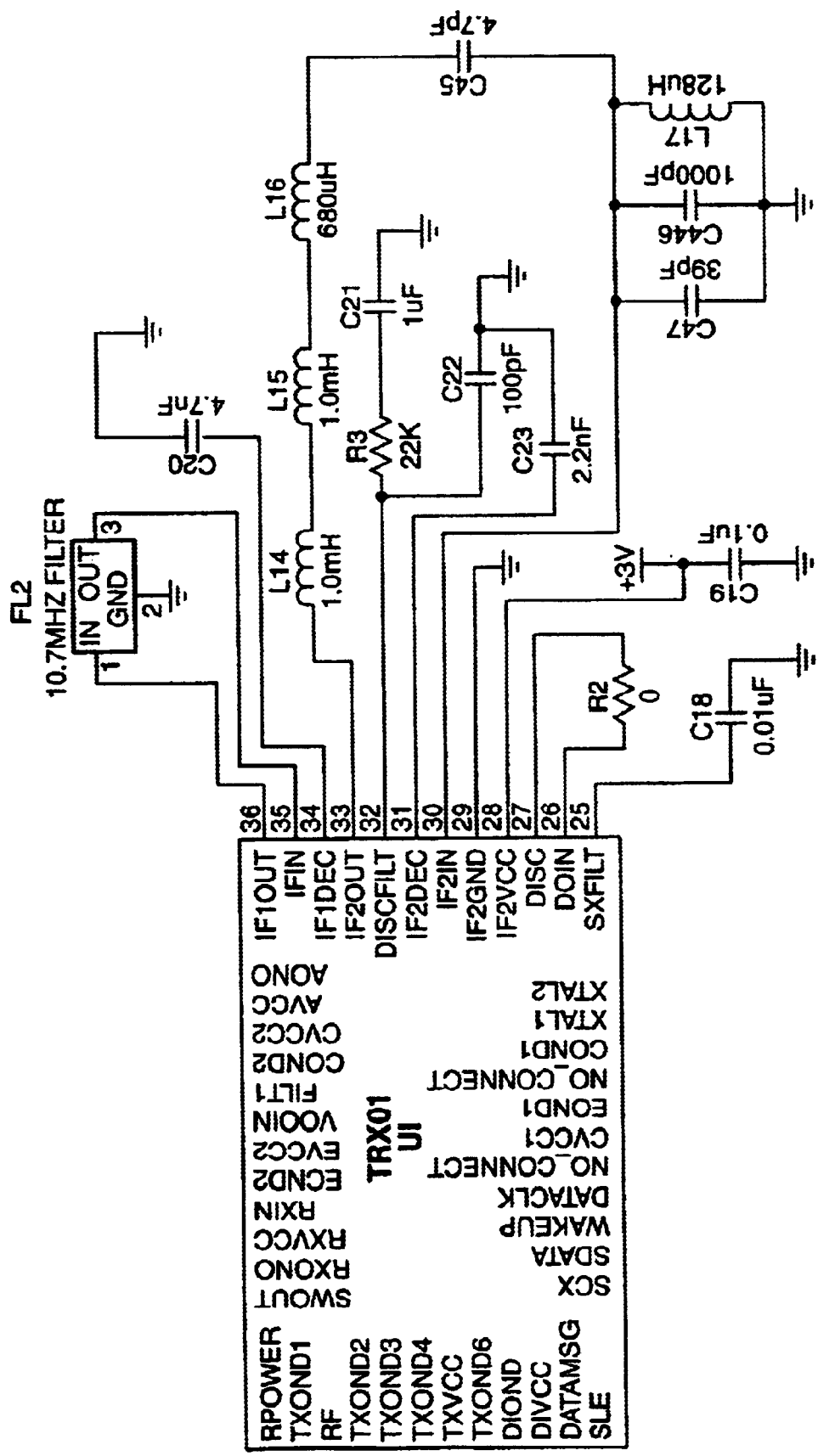
Figure 19G:
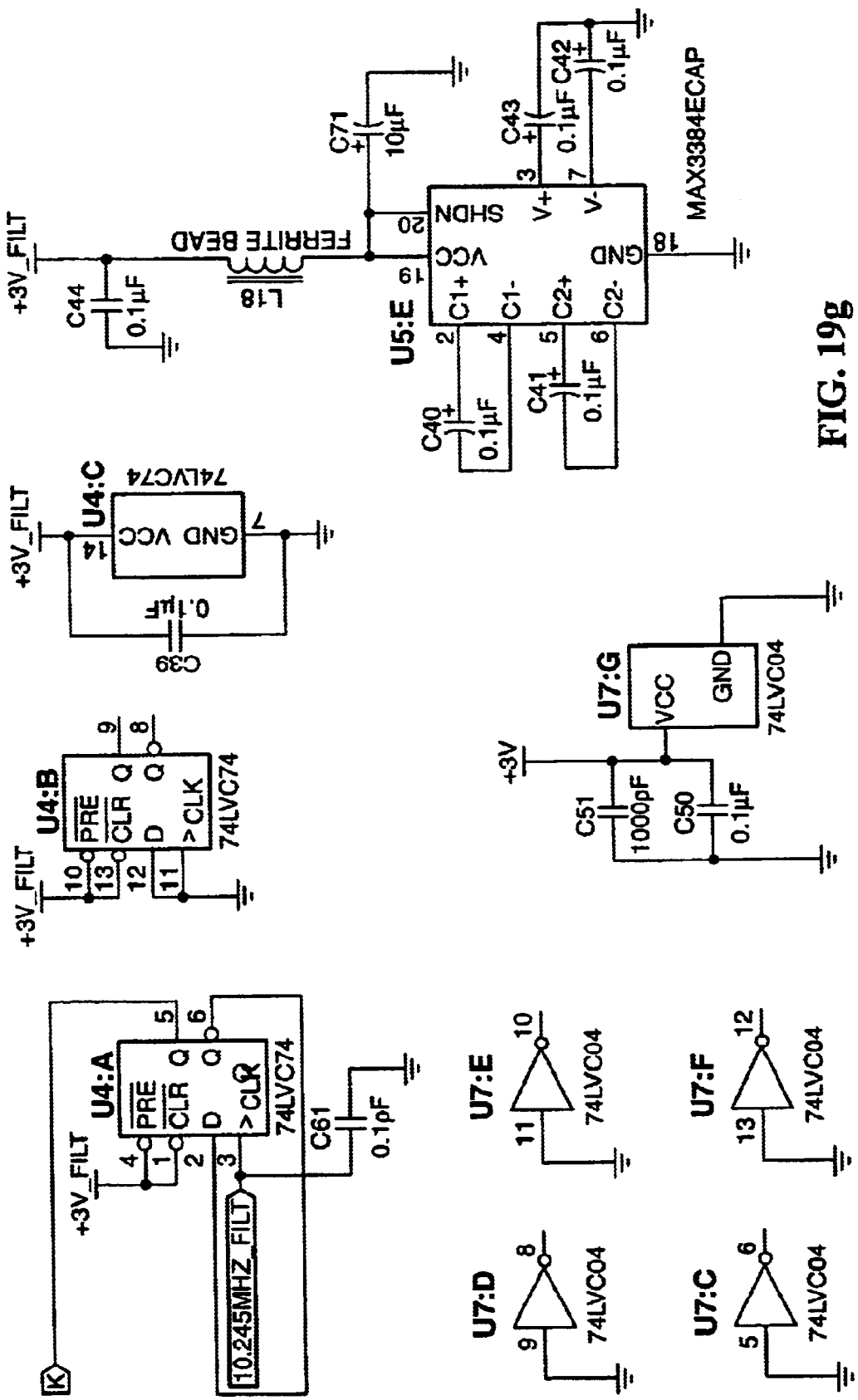

The Power/Clock line provides both clock signals and data signals when operating in 2-wire mode. The 2-wire mode signals are shown in FIG. 14. The data is transmitted into the register by modulating the width of the Power/Clock low time. The register transmits data to the interrogating device by providing an FSK signal during the clock low times. The 3-wire mode signals are shown in FIG. 15. The timing specifications are shown in FIG. 13. The Power/

Clock provides the clock signal and the data signals into the slave device. The data is transmitted into the register by modulating the width of the Power/Clock low time. The data coming from the slave device is transmitted on the data line in NRZ format. Although FIGS. 14 and 15 show the bi-directional start bit occurring at the second character in the reading data, the bi-directional start bit may occur as early as the second bit of the first character.

The protocol of the bi-directional interface covering both the two and three wire interfaces is, in one aspect, half-duplex, with the master initiating communications. The slave device need not look for a start bit until a message response has been sent. The master device shall use the Data 1 clock time when idling. The Data is asynchronous with a start bit, stop bit and eight data bits. The slave device must establish a clock low pulse width for data 0 and data 1. The slave device may measure any Power/Clock low pulse width sent until after the slave device first transmits a start bit, as shown in FIGS. 14 and 15, or the slave device may use the absolute times listed in FIGS. 12 and 13. Regardless of the method used for timing the slave device must measure the one of the reference pulses to determine if bi-directional mode may occur. If the reference pulse width does not fit into the specification for a data 1, it can be assumed that bi-directional mode will not be used. The slave device shall operate in unidirectional mode until the master device transmits a Start Bit, Data 0. Upon receipt of a start bit the slave device shall stop transmitting and begin receiving the master message. The slave shall remain in the "bi-directional mode" until power is removed from the interface.

FIG. 16 shows unit per pulse values for the RFR. As previously noted, the device of the invention can be configured to fit on a number of different water meter sizes. For example, as known to those skilled in the art, the size of water meter housing openings ranges from ⅝" to 2" for residential water meter applications. With mechanical meters, the register must be individually manufactured for a specific opening size, and mechanical components such as gear trains must properly tailored for the particular opening. Thus, conventional water meters registers are not easily modified to permit addition of pulse counting sensors or automatic meter reading (AMR) devices. However, a solid state register, as advantageously employed in accord one aspect of the invention, permits a single solid-state register to be used for water meter housing ranging from ⅝" to 2" (i.e., in a residential application). As known to those skilled in the art, the number of pulses sensed per gallon (or other predetermined unit) of flow changes depending upon the size of the meter. Instead of changing gear trains, the solid-state register of this aspect of the invention may be programmed in accord with the teachings herein to compensate for the variations in the pulse sensed by the meter owing to the difference in opening size, as illustrated in FIG. 16. In this way, an embodiment of the invention incorporating a solid-state register provides enhanced flexibility in application.

Still further, this flexibility includes enhanced resolution capabilities. The aforementioned magnetic sensor advantageously applied in the invention detects every revolution of the magnet in the meter, typically 58 revolutions per gallon. Therefore the system of the invention can, in this aspect, display consumption in increments of 1/58 gallon. Significantly, the resolution in the present invention incorporating solid state features is programmable, whereas mechanical odometers are of fixed, generally lesser resolution on the order of gallons or tenths of a gallon.

The meter or register of the invention is of solid state design and incorporates a planar sensor technology from Sentec, Ltd. of Cambridge, England. Referring to FIG. 17(a), placement of the meter circuitry inside the meter enclosure is shown. FIGS. 17(b) and 17(c) show a cross section of the enclosure, the printed circuit board and an optional liquid crystal display (LCD) as well as an enlarged sectional view of the printed circuit board (PCB) placed next to the sensor leads. FIGS. 17(d) and 17(e) show a cross-section of the enclosure along the circuit board and the LCD where a front view of the board and the side view of the LCD are visible. The sensor leads are located inside a cup-shaped indentation at the bottom of the meter enclosure.

FIG. 18 depicts the functional block diagram of a RF Register/Index (RFR/RFI) with an integrated radio powered by an internal battery and designed for use for meters such as, but not limited to, water and gas meters to provide radio frequency (RF) transmission capabilities. The primary function of the RFR/RFI is to count pulses produced by meter flow, calculate totalized flow, and transmit RF data to a receiving device. Such transmission is preferably periodic and is tied, for example, to prescribed time periods (e.g., minute by minute, hourly, daily, weekly, bi-weekly, monthly) or commodity quantity/usage levels. The RFR/RFI is advantageously a solid-state (e.g., all-electronic) device with only a few moving parts, such as the rotation of the Barkhausen Effect sensor magnet discussed below, and is configured as a direct replacement or retrofit for existing water meter and gas meters.

A microprocessor, preferably a low-power processor, is shared both for collecting and processing utility consumption data and preparing the RF transmitter for communicating the collected data to an interface device at certain intervals. One suitable low-power processor, particularly for larger (e.g., typically non-residential) applications is the Texas Instruments MSP430 series mixed signal microcontroller, more specifically, model number MSP430F135. This microcontroller is able to support the additional functionality required of larger meters, such as the larger meters of the Invensys™ family including Turbo™, which require, for example, more rotation sensors, enhanced LCD capabilities, and more complex calculations. However, the capabilities of the microcontroller may be scaled up or down commensurate with the complexity of the monitored system, the complexity of the meter(s), and cost considerations. A rotation sensor and a programming port provide inputs to the microprocessor while the outputs are an RF antenna for transmitting data to the interface device, a liquid crystal display (LCD) interface for displaying data and indicators, and a programming port. External and internal battery units provide power for data collection and transmission functions.

A suitable RF transmitter for low-cost wireless data transfer, such as wireless metering, includes an ADF7010 High Performance ISM Band ASK/FSK/GFSK Transmitter IC manufactured by Analog Devices, Inc. This RF transmitter contains an integrated VCO and Fractional-N PLL. The output power, channel spacing, and output frequency are programmable with 4 24-bit registers. The use of a fractional-N PLL enables the user to select between the European ISM bands, as well as the US 902–928 MHz band depending on the application. It is also possible to choose 4 different modulation schemes—Binary or Gaussian Frequency Shift Keying (FSK/GFSK), Amplitude Shift Keying (ASK), or On/Off Keying (OOK). This RF transmitter also features a crystal compensation register that provides +/−1 ppm accuracy in output frequency utilizing an inexpensive crystal as a reference. Control of four on-chip registers is provided by a 3-wire interface. This RF transmitter operates with a power supply ranging from 2.2V to 3.6V.

Another suitable RF transceiver includes the TRX01 or AT86RF211 manufactured by Atmel Corp. of San Jose, Calif. This low-voltage (2.4V) device is a single-chip transceiver dedicated to low power wireless applications, such as automatic meter reading, optimized for ISM band operations from 400 MHz to 950 MHz. An illustrative schematic of the TRX01 is provided in FIGS 19(a)–19(g). The TRX is V suitable in accord with the invention, particularly in combination with a Meter Transmit Unit (MTU), a unit that connects an ECR and transmits the data via RF, comprising ADI's ADF7010 transmitter.

In one aspect of the invention, a Sensus™ Low-Power (LP) Link antenna is employed in accord with the invention. However, other antennas are suitable in accord with the teachings of the invention herein.

To measure utility resource (e.g., water) flow rate, the rotation of a magnet in the meter is sensed with a Barkenhausen Effect sensor sealed inside the register enclosure. A suitable sensor in accord with the invention includes the Series 2000 Wiegand Magnetic Sensors manufactured by HID Corporation of North Haven, Conn. The sensor is capable of detecting rotations from 0 Hz to 50 Hz of a two-pole magnet rotor. Significantly, particularly for water meter applications, the sensor itself does not require a power source. Further, the design of the sensor, and its support circuit, makes meter circuitry immune to vibration should the meter "park" at the rotation count angle. The reaction torque produced by the sensor is less or equal to that of the current mechanical registers, and will therefore not reduce meter performance. All arithmetic calculations performed by the RF meter affects the total displayed volume by no more than 0.01 percent. The software design allows for correction of meter non-linearity to improve overall meter performance.

Electronic RF water registers and the gas RF indexes are powered by a single-cell lithium thionyl chloride battery sealed within the meter enclosure. A parallel capacitor is added to the battery to provide the peak current needed for RF transmission. The enclosure includes terminals to allow connection of an external battery that may be replaced periodically. In the event the battery power is lost, all configuration data and accumulated totalized data will be saved at appropriate intervals and/or upon designated events, such as indications of imminent or actual power loss, to an internal EPROM or suitable non-volatile storage means and will be retrieved when the external battery is connected. In one aspect of the invention, the design life of the internal battery will be at least 10 years.

The microprocessor and its associated circuitry are disposed on a printed circuit board fully contained within the meter enclosure. The microprocessor controls and performs processing tasks related to data collection from sensors, user interface, and the RF transmitter. The processor records the number of sensed forward rotations of the meter magnet as a pulse count, calculates totalized flow using the pulse count and the meter chamber constant, and then optionally displays the totalized flow on the LCD. The processor may perform additional calculations on collected data, including but not limited to display rate or linearization of the meter flow characteristic. To control the RF transmitter, the processor incorporates a low-power timer that wakes up the transmitter at specific intervals and commands it to transmit the collected data to the interface device.

The LCD itself includes, in one aspect, an LCD having 8 7-segment digits, four decimal point spaces, and three "dead" zeros as an indication of resolution, with the primary character height being about 0.20 inches or 8 mm. It is preferred that the LCD be configured with the following enunciators: total; GAL, IGAL, CF, $m^3$; Low Flow Indicator, and Dead Zero Indicators. It is also preferred to include a low flow and low battery annunciator.

As discussed above, the RF transmitter may advantageously use spread spectrum frequency-hopping algorithm and, in accord therewith, sequentially transmit the collected data over a plurality of frequencies, such as 50 different channels. Spread spectrum is a particular type of modulation which scatters data transmission across the available band in a "pseudo random" pattern. This manner of communication makes the signal resistant to noise and interference. Therefore, it takes 50 hours for the frequency hopping sequence to be repeated. It is preferred to get at least one reliable reading per day and transmission of data 24 times a day, each time at a different channel, permits acceptable data transmission despite high interference levels. As previously noted, the rate of transmission may be easily varied in accord with the particular system requirements and may include transmission on a minute to minute basis, hourly, daily, or weekly, for example.

The processor supports additional features such as low-battery indicator, temperature-sensing data, electronic tamper detection and a low-flow indicator. All user programmable settings and factory settings are stored in a non-volatile memory and updated when changed. The non-volatile storage device stores the collected data in case of power loss to ensure that users access to reading data even after the battery has expired.

Low power RF transmitters installed into gas and water meters communicate water and gas meter data to the interface device. It is noted that transceiver modules installed in electricity meters combined with an interface device or into stand-alone interface devices are line powered and do not need battery connection. Transmitters installed in water and gas meters can co-exist in a network of up to 200 Switch/Sensor/Confirmed Switch devices and together with approximately 12 Appliance devices and 4 Video/LAN devices. The transmitter is also designed, in one aspect, to communicate a minimum of 4 times per day. As noted, the RF transmitter sends to the interface device collected meter data using, in one embodiment, a spread spectrum frequency hopping protocol. RF transmission intervals, channel frequencies and their sequences are programmable. Moreover, the communication protocol itself and algorithms employed thereby are also programmable and the particular embodiments discussed herein are viewed as exemplary and non-limiting.

The meter uses an inductively coupled programming port for configuration and setup. The coil for this port is internal to the meter enclosure, and communicates through enclosure walls. The protocol for programming operation conforms to the existing bi-directional programming standard within Invensys™/Water. Although this port can be used to read the register, as in a TouchRead™ system, the primary use of this port is for programming.

Figure 21:
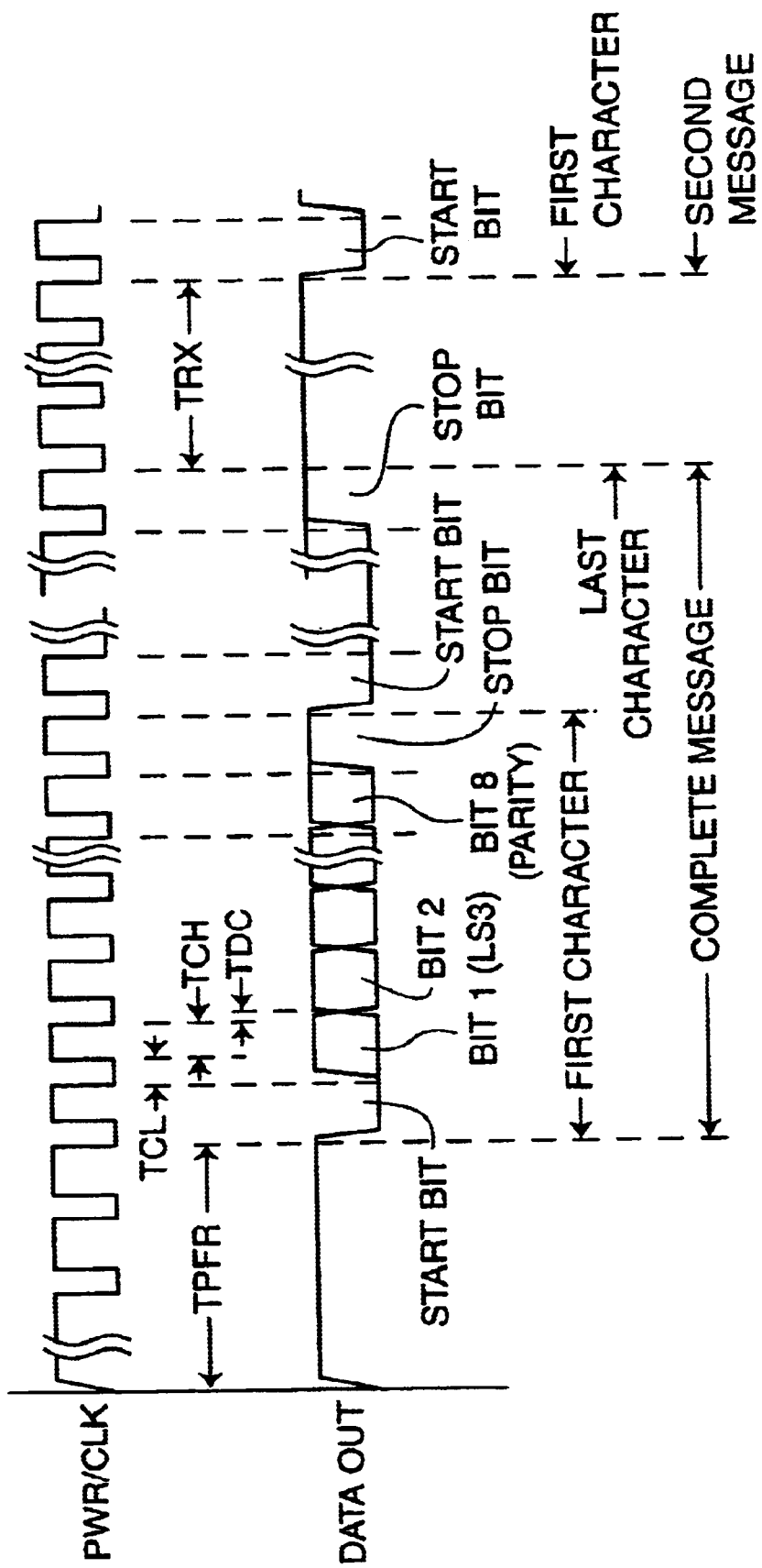
FIG. 21 shows voltage and timing requirements in accord with an aspect of a register interface protocol of the invention.

One aspect of the register interface specification follows. Interface to the registers is through a direct connection using three wires and/or, in a preferred aspect of the invention, through an inductive coupling, such as the inductively coupled TouchRead System. The direct connect interface consists of the three electrical connections of power/clock, data, and common. The power/clock line supplies power to the register and also acts as a clock to control the data output rate. The data line is an open collector interface, which supplies serial data in the output direction only. Details of voltage and timing requirements appear in FIGS. 20 and 21.

All messages transmitted from the register are ASCII encoded, seven bits, even parity, transmitted in the pseudo asynchronous manner described.

All messages transmitted from the register will conform to one of two basic formats: (1) a fixed length message format or (2) a variable length message format. The fixed length format is of the form: RnnnniiiiiiiiCR, wherein: "R" is the leading character; "nnnn" is a four character meter reading; and "iiiiiiii" is an eight character identification number; "CR" is the carriage return character (ASCII value 0Dh). Valid characters for "n" are "0–9" and "?". Valid characters for "i" are: 0–9, A–Z, a–z, and ?. The variable length format consists of a leading character "V", a series of fields, and a terminator character "CR". The general form: V [field 1] [field 2] [field 3] . . . [field n] CR. The maximum length of the message is 254 characters, including the "V" and CR". The maximum number of fields per message is 63. All fields are preceded by the ";" as a field delimiter and terminated by either the next ";" or the "CR". The character following each ";" is a field identifier and all subsequent format definition of the field is specified individually by the field identifier. The maximum length of an individual field is 50 characters, including the ";".

Valid characters for field identifiers are "A–Z" and "a–z". Valid characters for the field data are the ASCII characters Hex 20 through Hex 7E, excepting the field separator ";" Hex 3B. Fields which contain a "value" refer to numeric values represented as a string. The value has two formats. The first field format is an integer having a range from −99999999 to +99999999. The second field format is a real number having a range from 1e+99 to 1e−99 with seven significant digits. For a value field decimals are allowed, negatives are allowed, positive value assumed unless noted. Exponential fields shall have a maximum of seven significant digits. The Exponential field shall be represented by a lower case "e". Valid characters for values are: "0–9", ".", "−", "+", "e". Field definition characters which have been reserved for other uses are: C, D, E, Q, T, F, H, P, S, U, B. At a minimum, all registers must transmit the I field as in the following example: V;Itiiiiii<CR>.

FIG. 22 defines the fields for the Variable Format data including several optional subfields which are enclosed in brackets "[,]". If more than subfield is defined for a field the subfields must appear in the order presented for this aspect of the invention.

The units and time fields are defined using the characters from FIGS. 23 and 24. The format for use is: u[:s] where u represents the Measurement Units as defined in FIG. 23 and s represents the Time Units as defined in FIG. 24. The "s" field is optional. If the "s" field is present, the representation is u per s. Example 1: A reading field representing 123456 US gallons would appear as: ;RB123456,0,4. Example 2: A flowrate field representing current flowrate of 300 gallons per minute would appear as: ;GC0300,0,4:2 The transmission of collected data is over an antenna capable of transmission over a distance of at least 200 feet and capable of penetrating at least six conventional residential walls. The transmitting antenna is designed as an internal part of the meter. However, the internal antenna is configured such that an external antenna can be easily and optionally added to the RF transmitter by a close-coupled connection which avoids the need for metallic connection through the meter housing.

Functional description of the water RF register and the gas RF index includes accumulating totalized pulses from the rotation of meter magnets, calculating and displaying totalized flow, transmitting AMR data, storing data in non-volatile data storage, monitoring battery level, programming interface and settings. The processor records the number of pulses from forward rotations of the meter magnet as a pulse count, totalizes flow using the pulse count and the meter chamber constant. The totalized flow is then displayed on the LCD and retained in the non-volatile memory in case of power loss. The totalized flow is further displayed in user specified units and resolutions where the "dead" zeroes on the LCD are used to indicate the resolution (i.e., if resolution is 100's then two dead zeroes will be used). The totalized flow is also stored and updated in accord with the user programmed settings, such as but not limited to once per hour.

The programming interface controls general functions, and specifically, data transmission functions of the meter that transmits to an interface device consumption data using spread spectrum frequency hopping via an internal transmitting antenna. All programming or interrogation is done through the programming interface using the communication protocols described herein, or substantially equivalent protocols, as known to those skilled in the art.

The programming port is inductively coupled and has a coil internal to the meter enclosure that communicates through its walls. Port operation conforms to the bi-directional communications protocol discussed above. The programming port may also be used to read the meter data, as in a TouchRead™ system. For example, in the TouchRead™ system, a programming or data capture gun is placed proximate to the meter and a coil inside the register, such as provided in the 2-wire system in accord with the invention, is then inductively coupled to a corresponding coil disposed within the gun, thus permitting communication between the devices. Conventionally, the register was connected by wires to a coil provided externally to the housing.

Additionally, local readings are included in the programming that includes Register ID, Total, Battery status and factory ID.

Programmable parameters that are programmed via the interface provide additional information related to the meter and its display. A factory ID command is used to set the identification number in the meter and its processor. This number is factory assigned and may not be changed during programming. A programmable ID command is used to assign a user programmable identification number to the meter. The default programmable number will be the same as the factory identification number. Customers may either request or set this ID number to their desired value. Additionally, a resolution command sets the resolution of the meter including the use of dead zeros on the display. A flow total preset command allows the processor to be preset to a given flow total that applies to the flow total displayed in normal mode only. A flow total units command sets the flow units that will be displayed on the LCD and transmitted in the reading string. Further, a reading mode command is used to configure the encoded reading string. The reading string may be customized to contain only information necessary to customer needs.

Although the present invention has been described and illustrated in detail, it is clearly understood that the same is by way of illustration and example only and is not to be taken by way of limitation, the spirit and scope of the present invention being limited by the terms of the appended claims and their equivalents.

What is claimed is:

1. A system, for collecting and communicating flow data for a commodity including a liquid, a gas, or electricity transported via a metered system, using wireless data transfer, the system comprising:

at least one meter positioned in the metered system for detecting the flow of the commodity, the meter having a first housing;

an enclosed second housing positioned on each of the meters;

a sensor contained within the second housing and configured to output a signal representative of a resource flow rate by measuring an output from said meter;

a register contained within the second housing, the register including a processor configured to receive said signal output by said sensor, process said signal in accord with a communication protocol instruction set to adapt said signal for transmission, and store the processed signal in a data storage device;

a programming port contained within the second housing and coupled to the processor, such that programming instructions and recorded information can be communicated to and from the processor from external to the second housing through the programming port;

a wireless transmitter integrated with the processor and contained within the second housing, the transmitter configured to output said processed signal from the meter independently of the programming port, wherein the processed signal can be received from the register through both the programming port and the wireless transmitter; and an interface device disposed externally to the meter and the second housing and configured to perform at least one of receiving data output from the transmitter and outputting instruction information to the transmitter.

2. A system for collecting and communicating flow data for a commodity including a liquid, a gas, or electricity transported via a metered system, using wireless data transfer, in accord with claim 1, wherein said wireless transmitter comprises an antenna and at least one of an RE transmitter and an RF transceiver, and wherein said sensor comprises a magnetic rotation sensor utilizing the Barkhausen effect to detect commodity flow.

3. A system for collecting and communicating flow data for a commodity including a liquid, a gas, or electricity transported via a metered system, using wireless data transfer, in accord with claim 2, wherein said interface device comprises an external antenna, wherein said register is a programmable solid state device, and wherein said meter is configured to output said processed signal from the meter using RE spread spectrum frequency hopping.

4. A system for collecting and communicating flow data for a commodity including a liquid, a gas, or electricity transported via a metered system, using wireless data transfer, in accord with claim 1, wherein said register and processor adapt said signal for RF transmission by a RF transmitter, wherein said wireless transmitter is a RE transmitter inductively coupled through the housing to an external antenna.

5. A system for collecting and communicating flow data for a commodity including a liquid, a gas, or electricity transported via a metered system, using wireless data transfer, in accord with claim 2, wherein the interface device, the wireless transmitter and the register include a software instruction set bearing instructions for performing at least one of transmitting and receiving data through the antenna and the wireless transmitter and uses at least one of a unidirectional or bi-directional communication protocol.

6. The system of claim 1 wherein the programming port includes an inductive coil coupled to the processor for receiving programming instructions from a location external to the housing and adjacent the programming port.

7. A system for collecting and communicating flow data for a commodity including a liquid, a gas, or electricity transported via a metered system, the system comprising:

a plurality of gas and water meters positioned in the metered system for detecting the flow of the commodities, each meter including a first housing and an enclosed second housing;

a sensor contained in the enclosed second housing of each meter and configured to output a signal representative of a commodity flow rate by measuring an output from said meter;

a register including a processor contained within each enclosed second housing, the processor configured to receive the signal output by the sensor, process the signal, adapt the signal for transmission and store the processed signal in a data storage device;

a wireless transmitter contained within each second housing and integrated with the processor such that the processor outputs the processed signal from the meter through the wireless transmitter;

a programming port contained within each second housing and coupled to the processor of each second housing, wherein programming instructions and recorded information can be communicated to and from the processor of each second housing from external to the second housing independently from the wireless transmitter such that the processed signal can be received from each register through both the programming port and the wireless transmitter; and an electric meter including an interface device located remotely from each of the plurality of meters wherein the interface device is configured to receive the processed signal from the plurality of wireless transmitters and output instruction to the plurality of wireless transmitters, wherein the interface device is positioned in the metered system.

8. The system of claim 7 further comprising a programming port contained within each housing and coupled to the processor of each housing, wherein programming instructions and recorded information can be communicated to and from the processor of each housing from external to the housing independently from the wireless transmitter such that the processed signal can be received from each register through both the programming port and the wireless transmitter.

9. The system of claim 7 wherein the interface device comprises:

an enclosed interface housing;

an interface sensor contained within the enclosed interface housing and configured to output a signal representative of electricity usage;

a processor contained within the interface housing and configured to receive the signal output by the interface sensor, process the signal, adapt the signal for transmission and store the processed signal in a data storage device; and a wireless transmitter contained within the interface housing and integrated with the processor such that the processor outputs stored data from the interface device through the transmitter.

10. The system of claim 4 wherein the interface device further comprises a programming port contained within the interface device housing and coupled to the processor such that programming instructions can be communicated to the processor from external to the housing.

11. The system of claim 10 further comprising a programming port contained within each housing and coupled to the processor of each housing, wherein programming instructions and recorded information can be communicated to and from the processor of each housing from external to the housing independently from the wireless transmitter such that the processed signal can be received from each register through both the programming port and the wireless transmitter.

12. The system of claim 9 wherein the interface device includes a data storage device for recording and storing processed signals received from the plurality of meters.

13. The system of claim 7 wherein the wireless transmitter includes an antenna and at least one of an RF transmitter and an RF transceiver.

14. The system of claim 9 wherein the plurality of meters are gas and water meters.

15. A system for collecting and communicating flow data for a commodity including a liquid, a gas, or electricity transported by a metered system, the system comprising:

a plurality of meters positioned in the metered system for detecting the flow of the commodity, each meter having a first housing and an enclosed second housing;

a sensor contained in the enclosed second housing of each meter and configured to output a signal representative of a commodity flow rate through the meter by measuring an output of said meter;

a register contained within each enclosed second housing, the register including a processor configured to receive the signal output by the sensor, process the signal, adapt the signal for transmission from the second housing and store the processed signal in a data storage device;

a wireless transmitter including an RF transmitter and an RF transceiver contained with each second housing and integrated with the processor;

an antenna coupled to the processor such that the processor outputs the processed signal through the antenna;

a programming port contained within each second housing and coupled to the processor of each second housing, each programming port including an inductive coil coupled to the processor such that programming instructions and recorded information can be communicated to and from the processor of each second housing independently from the antenna such that a processed signal can be received from each register through both the programming port and the antenna; and an interface device located remotely from each of the plurality of meters and enclosed second housings, the interface device being configured to receive the processed signal from the antennas and output instructions to the antennas, the interface device including a processor configured to receive the signals output by the plurality of antennas, process the received signals, adapt the signals for further transmission and store the processed signal in a data storage device.

16. The system of claim 15 wherein the interface device further includes a wireless transmitter contained within an enclosed third housing and integrated with the processor of the interface device.

17. The system of claim 15 wherein the interface device is positioned in the metered system and operates to detect the flow of electricity through the interface device such that the interface device functions as an electric meter.

18. The system of claim 17 wherein the plurality of meters are gas meters and water meters.

19. The system of claim 18 wherein the interface device can communicate over a wide area network (WAN).

* * * * *